United States Patent [19]

Hershbarger et al.

[11] Patent Number: 5,654,984
[45] Date of Patent: Aug. 5, 1997

[54] SIGNAL MODULATION ACROSS CAPACITORS

[75] Inventors: Russell A. Hershbarger, Nevada City; Eric Davies, Grass Valley, both of Calif.

[73] Assignee: Silicon Systems, Inc., Tustin, Calif.

[21] Appl. No.: 161,741

[22] Filed: Dec. 3, 1993

[51] Int. Cl.$^6$ .................................................. H04B 3/00
[52] U.S. Cl. ................................................ 375/257; 330/10
[58] Field of Search ............................ 375/36, 121, 7, 375/219, 222, 257; 333/24 C; 330/10

[56] References Cited

U.S. PATENT DOCUMENTS

| | | | |
|---|---|---|---|
| 3,187,260 | 6/1965 | Dave | 375/257 |
| 3,201,714 | 8/1965 | Border et al. | 333/24 C |
| 3,290,651 | 12/1966 | Slattery et al. | 375/257 |
| 3,693,114 | 9/1972 | Kempf | 333/24 C |
| 3,771,069 | 11/1973 | Levacher et al. | 333/24 C |
| 3,909,821 | 9/1975 | Jagoda | 333/24 C |
| 4,086,534 | 4/1978 | Olson | 375/257 |
| 4,425,663 | 1/1984 | Lam | 333/24 C |
| 4,493,092 | 1/1985 | Adams | 375/257 |
| 4,504,793 | 3/1985 | Yokoyama | 330/10 |
| 4,580,239 | 4/1986 | Greenhill et al. | 375/121 |
| 4,697,166 | 9/1987 | Warnagiro et al. | 375/219 |
| 4,775,864 | 10/1988 | Herman | 375/219 |
| 4,843,339 | 6/1989 | Burt et al. | 330/10 |
| 4,875,223 | 10/1989 | Curtis | 375/36 |
| 5,033,062 | 7/1991 | Morrow et al. | 375/7 |
| 5,057,847 | 10/1991 | Väisänen | 333/24 C |
| 5,083,136 | 1/1992 | Wells | 333/24 C |
| 5,095,291 | 3/1992 | Staschover et al. | 375/36 |
| 5,105,441 | 4/1992 | Borst et al. | 375/36 |
| 5,384,808 | 1/1995 | Van Brunt et al. | 375/257 |

FOREIGN PATENT DOCUMENTS

| | | | |
|---|---|---|---|
| 2806850 | 3/1979 | Germany | 375/36 |
| 404196644A | 7/1992 | Japan | 375/36 |

*Primary Examiner*—Melvin Marcelo
*Assistant Examiner*—Conguan Tran
*Attorney, Agent, or Firm*—Hecker & Harriman

[57] ABSTRACT

A method and apparatus for communicating a modulated signal across an isolation barrier using capacitors is provided. The present invention allows low distortion communication of an audio signal across an isolation barrier without the need for a large and bulky isolation transformer. The present invention may be used to provide telephone line isolation for modem applications compliant with governmental regulations. A line interface integrated circuit (IC) may be connected directly to a telephone line and powered by the telephone line. The line interface IC may include a sigma delta modulator to communicate the receive signal across a capacitor over an isolation barrier and a digital-to-analog (D/A) converter to provide an analog transmit signal from a sigma delta bit stream communicated across a capacitor over an isolation barrier. Circuitry on the opposite side of the isolation barrier includes similar components to process the transmit and receive signals.

14 Claims, 14 Drawing Sheets

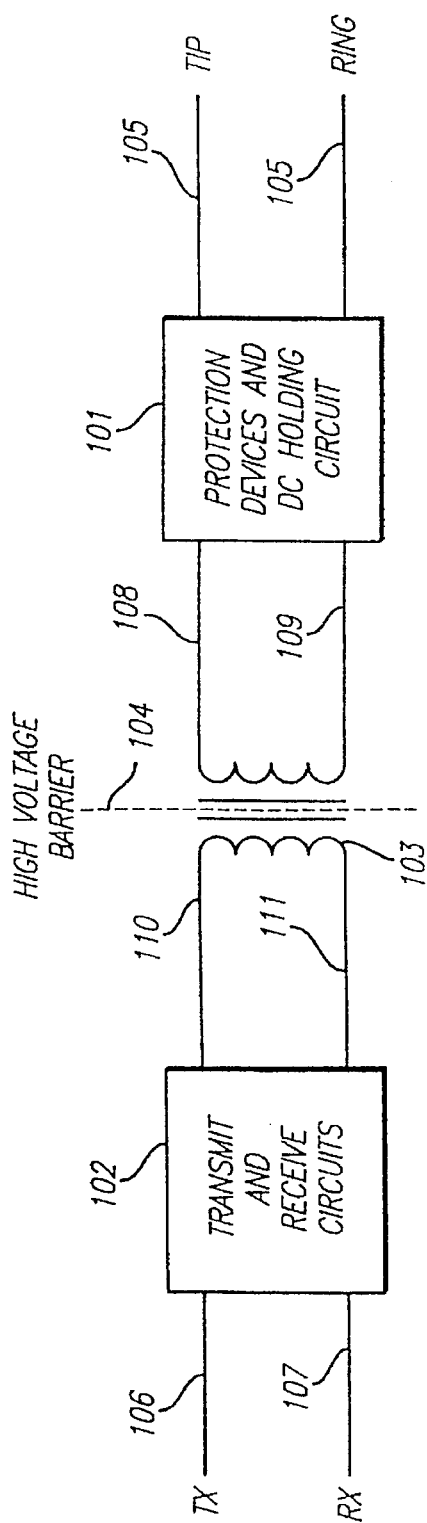
FIG. 1 _PRIOR ART_
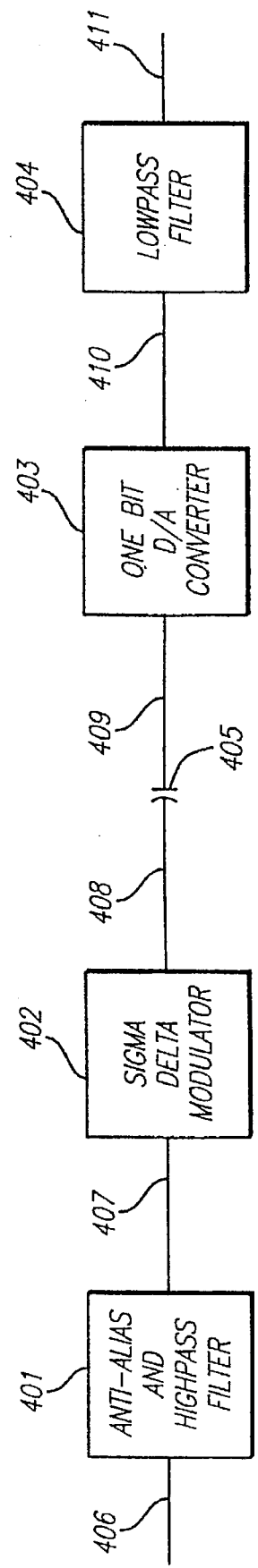
FIG. 4

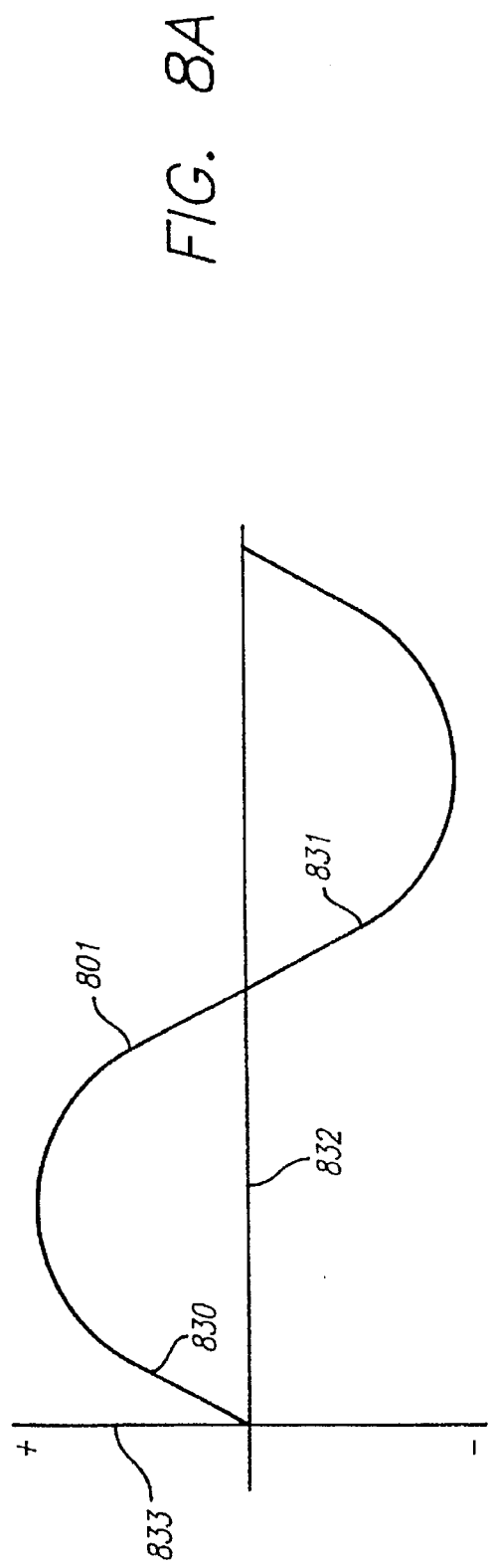
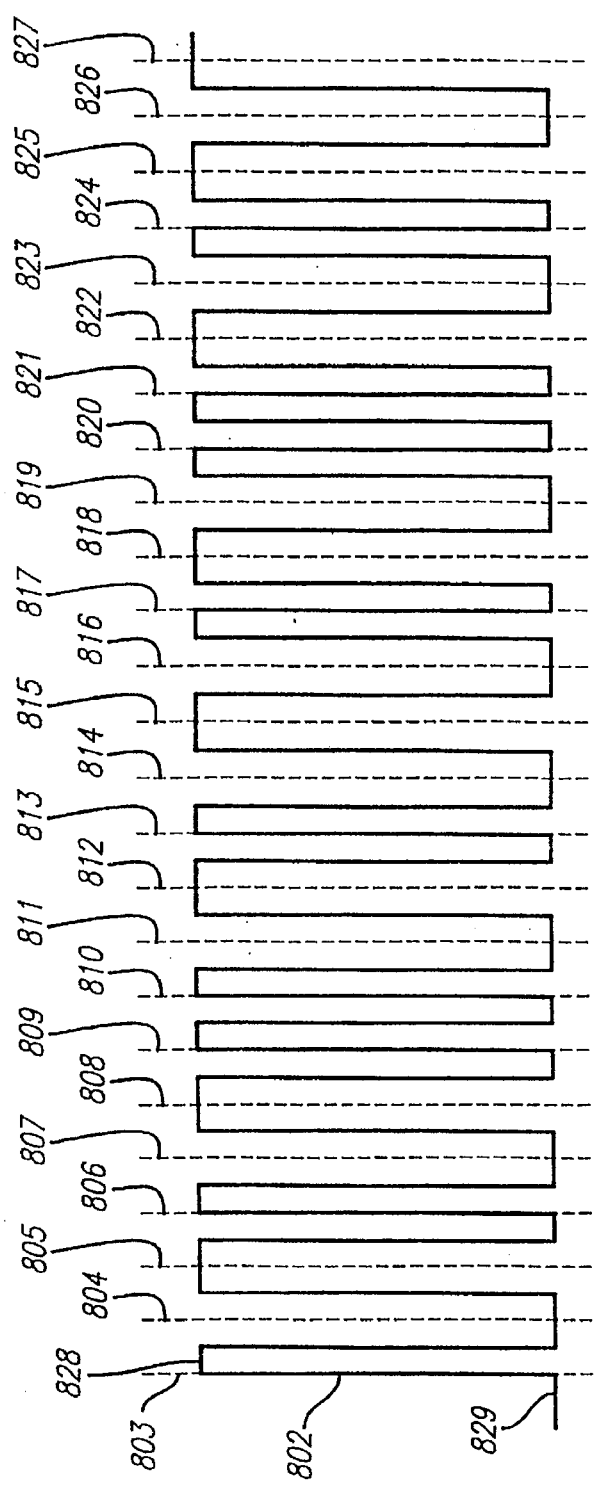

SIGNAL MODULATION ACROSS CAPACITORS

BACKGROUND OF THE INVENTION

1. Field of the Invention

The present invention relates to the coupling of signals across capacitors.

2. Background Art

It is sometimes necessary to couple a signal between two or more electrical circuits that operate at different voltages. Circuitry for coupling a signal under such circumstances must provide for the isolation of the voltages of the different circuits to prevent interference or damage to the circuits from voltages exceeding the intended operational voltage ranges of the circuits. For example, when interfering a computer to a telephone line, such as with a modem, it is necessary to provide isolation between the circuits of the computer, which operate at controlled low voltages, and the telephone line, where voltages over a very wide range, including high voltages, may be present. While such isolation is necessary, it must be accomplished in a manner that allows the coupling of signals between the computer and the telephone line without undesirable levels of distortion, attenuation, or other degradation of the signals.

Traditionally, such isolation was provided using an isolation transformer. An isolation transformer magnetically couples signals between its windings while keeping the windings electrically isolated from one another. Since DC components of a signal do not pass through the isolation transformer, DC potentials on opposite sides of the isolation transformer are isolated from one another.

An isolation transformer comprises a core of magnetic material and a plurality of windings. Since the minimum size of the core and windings is dictated by the desired electrical parameters of the transformer, the size of the transformer cannot be reduced below that minimum. Thus, isolation transformers are typically relatively large and bulky. They often have dimensions that are inconsistent with miniaturized packaging configurations. Isolation transformers are also usually rather expensive since the require production and assembly of specialized magnetic materials, insulated wire, insulating materials, and connection terminals.

FIG. 1 is a diagram of a telephone line interface circuit of the prior art. Telephone line 105, which comprises tip and ring conductors, is coupled to protection devices and DC holding circuit 101. Protection devices and DC holding circuit 101 is coupled to node 108, which is coupled to a first terminal of a first winding of transformer 103. Protection devices and DC holding circuit 101 is also coupled to node 109, which is coupled to a second terminal of the first winding of transformer 103. A first terminal of the second winding of transformer 103 is coupled to node 110, which is coupled to transmit and receive circuits 102. A second terminal of the second winding of transformer 103 is coupled to node 111, which is coupled to transmit and receive circuits 102. Transmit signal TX is applied to node 106, which is coupled to transmit and receive circuits 102. Transmit signal TX is applied to node 106, which is coupled to transmit and receive circuits 102. Transmit and receive circuits 102 are coupled to node 107, which provides receive signal RX.

The first winding and the second winding of transformer 103 are isolated from each other so as to maintain high voltage barrier 104. Thus, great voltage differences between the circuits on the two sides of high voltage barrier 104 may exist without harm or interference to circuits on the other side of high voltage barrier 104.

Any signals desired to be transmitted over telephone line 105 are applied as signal TX at node 106. The signal to be transmitted is processed by transmit and receive circuits 102 and applied across nodes 110 and 111. The signals are coupled across coupling transformer 103 to nodes 108 and 109. The signals pass through protection devices and DC holding circuit 101 to be applied to telephone line 105. Signals on telephone line 105 pass through protection devices and DC holding circuit 101, through nodes 108 and 109 to transformer 103. Transformer 103 couples the receive signals to nodes 110 and 111, which couple the receive signals to transmit and receive circuits 102. Transmit and receive circuits 102 output the receive signals at 107, which provides receive signal RX.

Another approach involves coupling signals with optocouplers. Optocouplers (or optoisolators) include an LED having its light output coupled to a phototransistor, photodiode, or other photosensitive device, with the assembly encapsulated in an opaque package. Since optocouplers rely on LEDs, which do not exhibit linear response, optocouplers are generally used to transmit signals of a digital nature, which do not require linear devices for transmission. Moreover, reasonably priced optocouplers are generally too slow to provide sufficient transmission quality.

Capacitors are used to couple signals. Since the frequency range of the signals that may be coupled is related to the value of the capacitors, only signals of certain frequency ranges may be coupled by capacitors of particular values. Capacitors typically have a size proportional to their value. Also, there is typically an inverse relationship between the value of a capacitor and the frequencies that it will pass. Thus, a large capacitor is usually required to pass low frequency signals, for example, audio frequencies. Large capacitors are often too large and bulky to be accommodated by miniaturized packaging configurations. Large capacitors are also more expensive.

SUMMARY OF THE INVENTION

The present invention provides a method and apparatus for communicating a signal across a capacitive isolation barrier using sigma delta modulation. The present invention allows low distortion communication of an audio signal across an isolation barrier without the need for a large and bulky isolation transformer, a large and bulky capacitor, or an optocoupler.

The present invention uses a sigma delta modulator to convert an analog signal to a binary signal having a pulse density dependent on the amplitude of the analog signal. The pulse duration of the binary signal is preferably on the order of microseconds or fractions of microseconds, resulting in a binary signal that includes frequencies on the order of megahertz (MHz). Signals in the megahertz range can be effectively coupled by small capacitors, unlike signals in the audio frequency range. Thus, the need for large, bulky capacitors is avoided.

The analog signal provided to the sigma delta modulator is first filtered to limit the bandwidth of the signal and to prevent aliasing. The filtered analog signal is then applied to the sigma delta modulator, which provides a binary signal. The binary signal provided by the sigma delta modulator is communicated across a capacitor, which may have a value in the picofarad range, and received by a digital-to-analog (D/A) converter or by digital signal processing (DSP) circuitry. If the signal is received by a D/A converter, the D/A converter converts the binary signal to an analog signal. The analog signal is then filtered to remove noise that might otherwise result from the digital conversion and processing of the signal. If the signal is received by DSP circuitry, the DSP circuitry processes the signal digitally.

The present invention may be used to provide telephone line isolation for modem applications compliant with governmental regulations. A line interface integrated circuit (IC) may be connected directly to a telephone line and powered by the telephone line. The line interface IC may include a sigma delta modulator to communicate the receive signal across a capacitive isolation barrier and a digital-to-analog (D/A) converter to provide an analog transmit signal from a sigma delta bit stream communicated across a capacitive isolation barrier. Circuitry on the opposite side of the capacitive isolation barrier includes similar components to process the transmit and receive signals.

The present invention may be practiced at high frequencies (e.g. on the order of megahertz), allowing use of small capacitors (e.g. on the order of picofarads) to provide the high voltage isolation barrier. Circuitry on the telephone line side of the high voltage isolation barrier may derive its power from the telephone line, minimizing power supply requirements. Furthermore, since modem line interface circuits require A/D and D/A conversion, very little additional circuitry is needed to communicate signals across an isolation barrier according to the present invention. Thus, the disadvantages of the prior art have been overcome.

BRIEF DESCRIPTION OF THE DRAWINGS

FIG. 1 is a diagram of a telephone line interface circuit of the prior art.

FIG. 4 is a block diagram of a system comprising an embodiment of the present invention.

FIG. 5A illustrates an analog signal Waveform 501 illustrates one cycle of an sine wave. FIG. 5B illustrates a sigma delta bit stream derived from the analog signal of FIG. 5A.

FIGS. 8A and 8B illustrate an example of Manchester encoded sigma delta modulation.

DETAILED DESCRIPTION OF THE INVENTION

Figure 2:
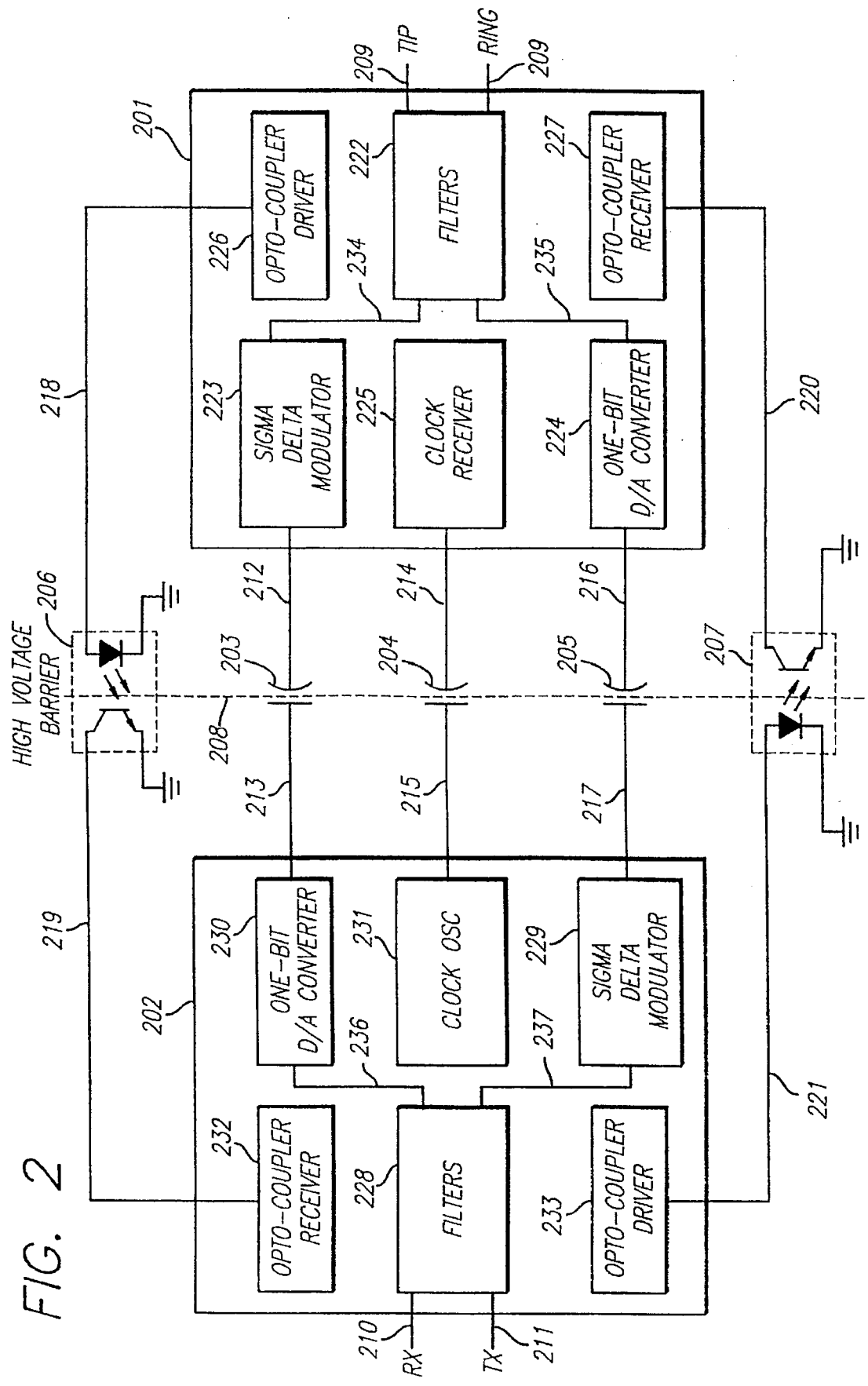
FIG. 2 is a block diagram of the preferred embodiment of the present invention.

A method and apparatus for communicating a signal across a capacitive isolation barrier using sigma delta modulation is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

It is often necessary to couple a signal between two electrical environments having different electrical characteristics. For example, one environment may be at one or more voltage levels, while the other environment may be at other voltage levels. Under such circumstances, it is usually necessary to isolate the environments from one another to ensure proper operation of and to prevent damage to the respective circuitry of the two environments. At the same time, it may be necessary to couple signals between the two environments. Thus, a method of coupling signals between two electrical environments while providing isolation between the two environments without the use of large, bulky coupling components is needed.

The present invention uses a sigma delta modulation technique to couple an analog signal across a capacitive isolation barrier. Since sigma delta modulation is often used to provide conversion between analog and digital forms of a signal (either A/D or D/A conversion), the need for extra circuitry beyond that which would otherwise be needed for conversion is minimized. The present invention uses sigma delta modulation both to facilitate analog-to-digital conversion and to provide a modulated signal suitable for transmission across a capacitive isolation barrier. By providing sigma delta modulation of signals on both sides of the isolation barrier, bidirectional communication across the isolation barrier may be provided.

The present invention is useful in telephone line interface applications, especially applications where a computer is interfaced to a telephone line, for example, with a modem. One side of the isolation barrier may be coupled to the telephone line, while the other side of the isolation barrier may be coupled to a computer or other user device, such as a telephone instrument. The present invention provides bidirectional coupling of audio signals across the isolation barrier in a manner that complies with regulatory requirements. Coupling of digital signals, such as digital control signals, is optionally provided via optocouplers.

Since modems often rely on digital signal processing and use A/D and D/A converters, and these converters often use sigma delta modulation in the conversion process, the present invention may be practiced with a minimum of additional complexity. Portions of the conversion circuitry may be located on each side of the isolation barrier, with the sigma delta modulated signal coupled across the isolation barrier. Portions of the circuitry on the telephone line side may derive their power from the telephone line, while portions on the computer or subscriber side may derive their power from the computer power supply or another power source on the subscriber side, thereby minimizing power supply complexity and reducing the amount of power supplied by the computer power supply.

FIG. 2 is a block diagram of the preferred embodiment of the present invention. Telephone line 209, which comprises tip and ring conductors, is coupled to block 201. Block 201 is coupled through node 212 to a first terminal of capacitor 203, through node 214 to a first terminal of capacitor 204, and through node 216 to a first terminal of capacitor 205. Block 201 is also coupled through node 218 to the anode of the LED of optocoupler 206 and through node 220 to the collector of the photo transistor of optocoupler 207. The cathode of the LED of optocoupler 206 is coupled to ground. The emitter of the photo transistor of optocoupler 207 is coupled to ground.

Block 202 is coupled through node 213 to the second terminal of capacitor 203, through node 215 to the second terminal of capacitor 204, and through node 217 to the second terminal of capacitor 205. Block 202 is also coupled through node 219 to the collector of the photo transistor of optocoupler 206 and through node 221 to the anode of the LED of optocoupler 207. The emitter of the photo transistor of optocoupler 206 is coupled to ground. The cathode of the LED of optocoupler 207 is coupled to ground. Transmit signal TX is applied to block 202 through node 211. Block 202 provides receive signal RX through node 210.

Block 201 comprises filter block 222, sigma delta modulator block 223, digital to analog (D/A) converter block 224, clock receiver block 225, optocoupler driver block 226, and optocoupler receiver block 227. Block 202 comprises filter block 228, sigma delta modulator 229, D/A converter 230, clock oscillator 231, optocoupler receiver 232, and optocoupler driver 233. The tip and ring conductors of telephone line 209 are coupled to filter block 222. A receive signal from filter block 222 is coupled through node 234 to sigma delta modulator 223. Sigma delta modulator 223 provides a pulse density or sigma delta modulated version of the receive signal at node 212. The pulses of the sigma delta modulated signal at node 212 are coupled through capacitor 203 to node 213.

D/A converter 230 receives the sigma delta bit stream at node 213 and converts it to an analog signal at node 236. The signal from node 236 passes through filter block 228 and is output as receive signal RX at node 210. Transmit signal TX at node 211 is applied to filter block 228. Filter block 228 provides an output at node 237 to sigma delta modulator 229. Sigma delta modulator 229 provides a bit density or sigma delta modulated bit stream based on the transmit signal TX at node 217. The sigma delta bit stream at node 217 is coupled through capacitor 205 to node 216. The sigma delta bit stream signal at node 216 is coupled to D/A converter 224. D/A converter 224 converts the sigma delta bit stream signal at node 216 to an analog output at node 235. The signal at node 235 is coupled to filter block 222. Filter block 222 provides an output signal across the tip and ring conductors of telephone line 209.

Optocoupler driver block 226 provides a signal at node 218 to drive Optocoupler 206. Optocoupler 206 couples the signal at node 218 across barrier 208 to node 219. The signal at node 219 is received by optocoupler receiver block 232. Optocoupler driver block 233 provides a signal at node 221 to drive optocoupler 207. Optocoupler 207 couples the signal at node 221 across high voltage barrier 208 to node 220. The signal at node 220 is received by optocoupler receiver block 227.

Figure 3:
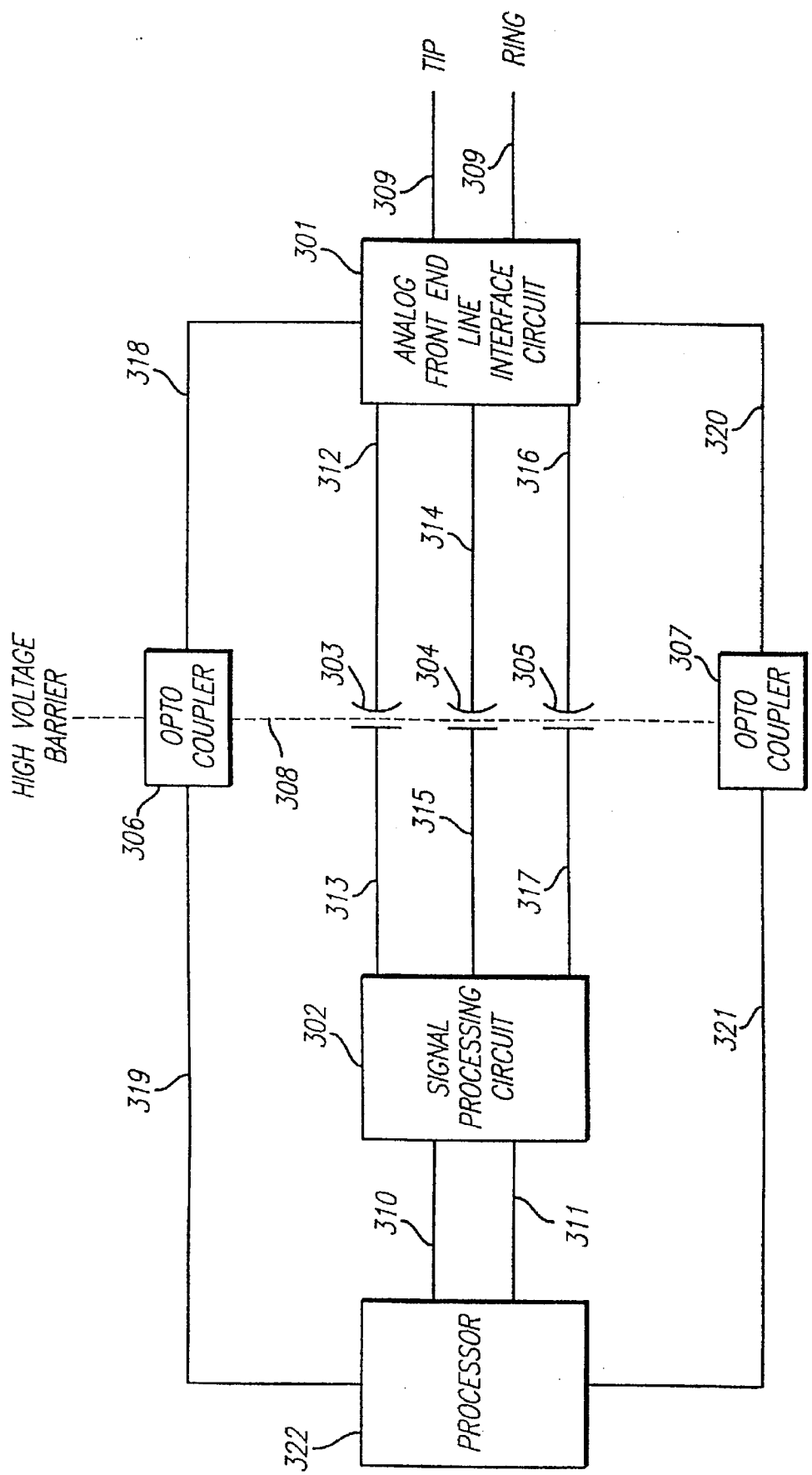
FIG. 3 is a block diagram illustrating a system comprising an embodiment of the present invention.

FIG. 3 is a block diagram illustrating a system comprising an embodiment of the present invention. The system may be used to implement a modem for communication of digital information over a telephone line. A tip and ring conductors of telephone line 309 are coupled to analog front end line interface circuit 310. Analog front end line interface circuit 301 is coupled through node 312 to a first terminal of capacitor 303, through node 314 to a first terminal of capacitor 304, and through node 316 to a first terminal of capacitor 305. Analog front end line interface circuit 301 is also coupled through node 318 to optocoupler 306 and through node 320 to optocoupler 307. Capacitors 303, 304, and 305 and optocouplers 306 and 307 maintain high voltage barrier 308.

Signal processing circuit 302 is coupled through node 313 to a second terminal of capacitor 303, through node 315 to a second terminal of capacitor 304, and through node 317 to a second terminal of capacitor 305. Processor 322 is also coupled through node 319 to optocoupler 306 and through node 321 to optocoupler 307.

Signal processing circuit 302 is coupled through nodes 310 and 311 to processor 322. Signal processing circuit 302 may be a digital signal processing (DSP) circuit or other signal processing circuitry, such as a D/A converter. Processor 322 may be a central processing unit (CPU), micro-control unit (MCU), such as a single IC microcontroller, or any other type of digital processor.

FIG. 4 is a block diagram of a system comprising an embodiment of the present invention. Node 406 is coupled to anti-alias filter block 401. Anti-alias filter block 401 is coupled through node 407 to sigma delta modulator block 402. Sigma delta modulator block 402 is coupled through node 408 to a first terminal of capacitor of 405. A second terminal of capacitor 405 is coupled through node 409 to one bit D/A converter block 403. One bit D/A converter block 403 is coupled through node 410 to low pass filter 404. Low pass filter 404 is coupled to node 411.

A signal at node 406 is filtered by anti-alias filter block 401 to prepare the signal for sigma delta modulation and to avoid aliasing. Anti-alias filter block 401 may optionally include a high pass filter to block DC voltages and any other undesired low frequency signals. The filtered signal is passed from anti alias filter block 401 through node 407 to sigma delta modulator 402. Sigma delta modulator block 402 produces a sigma delta bit stream at node 408 based on the signal at node 407.

The signal at node 408 is coupled to node 409 through capacitor 405. Capacitor 405 provides a high voltage barrier between nodes 408 and 409 to prevent unwanted voltages, such as DC voltages, from passing between nodes 408 and 409. The sigma delta bit stream at node 409 is converted to an analog signal at node 410 by one bit D/A converter 403. The analog signal at node 410 is low pass filtered by low pass filter 404 to provide an output signal at node 411.

Figure 9:
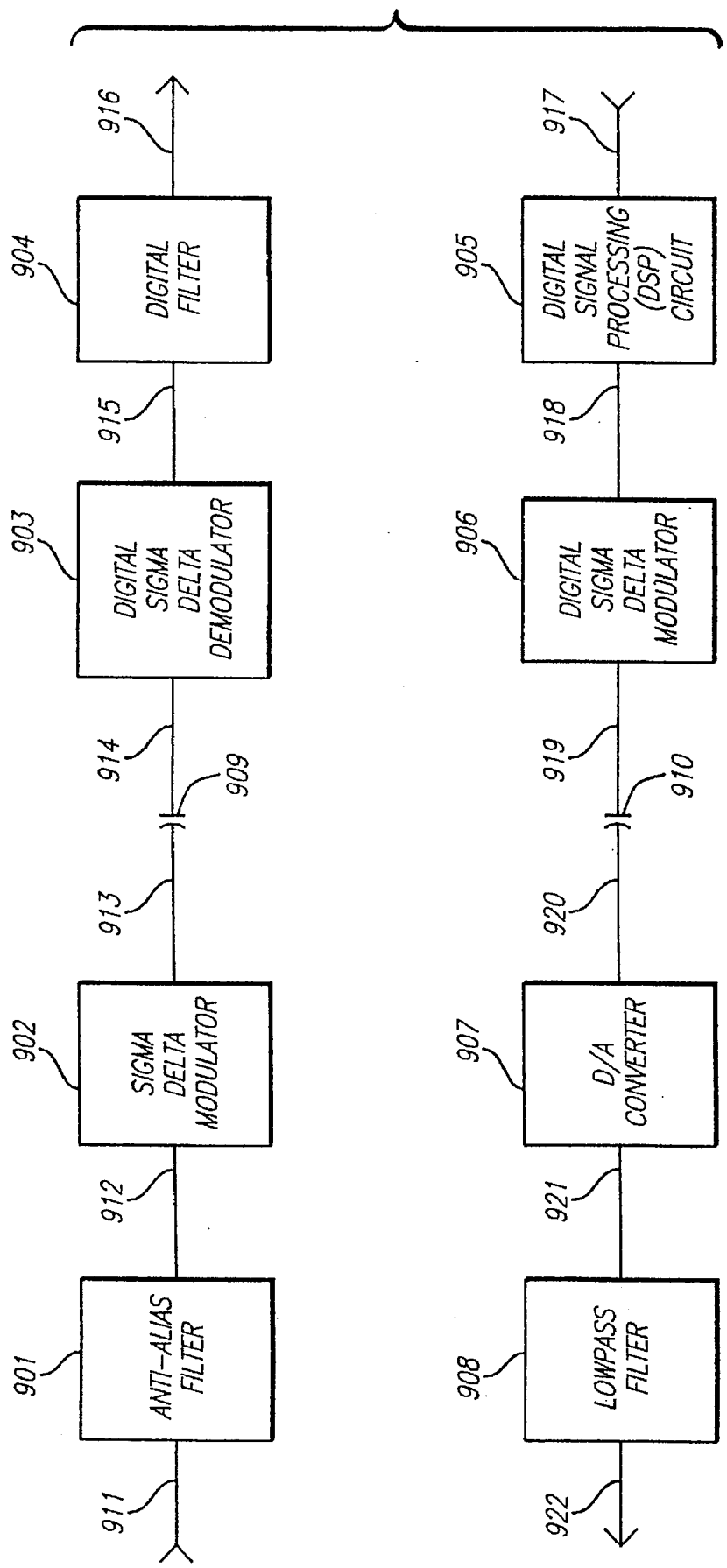
FIG. 9 is a block diagram of a system comprising an embodiment of the present invention.

FIG. 9 is a block diagram of a system comprising an embodiment of the present invention. Node 911 is coupled to anti-alias filter block. 901. Anti-alias filter block 901 is coupled through node 912 to sigma delta modulator block 902. Sigma delta modulator block 902 is coupled through node 913 to a first terminal of capacitor of 909. A second terminal of capacitor 909 is coupled through node 914 to digital sigma delta demodulator block 903. Digital sigma delta demodulator block 903 is coupled through node 915 to digital filter 904. Digital filter 904 is coupled to node 916.

A signal at node 911 is filtered by anti-alias filter block 901 to prepare the signal for sigma delta modulation and to avoid aliasing. Anti-alias filter block 901 may optionally include a high pass filter to block DC voltages and any other undesired low frequency signals. The filtered signal is passed from anti alias filter block 901 through node 912 to sigma delta modulator 902. Sigma delta modulator block 902 produces a sigma delta bit stream at node 913 based on the signal at node 912.

The signal at node 913 is coupled to node 914 through capacitor 909. Capacitor 909 provides a high voltage barrier between nodes 913 and 914 to prevent unwanted voltages, such as DC voltages, from passing between nodes 913 and 914. The sigma delta bit stream at node 914 is demodulated by digital sigma delta demodulator 903 to provide a digital signal at node 915. The digital signal at node 915 is digitally filtered by digital filter 904 to provide a digital output signal at node 916. The digital output signal at node 916 may be additionally processed using DSP circuitry, may be applied to a computer, CPU, microcontroller or MCU, or may be converted to an analog form.

A digital input signal is applied to node 917. Digital signal processing (DSP) circuit 905 processes the signal digitally to provide a digital signal at node 918. Digital sigma delta modulator block 906 converts the digital signal at node 918 to a sigma delta modulated signal at node 919 that is coupled through capacitor 910 to node 920. D/A converter 907 converts the digital signal at node 907 to an analog signal at node 921. Low pass filter 908 filters the analog signal at node 921 to remove any unwanted high frequency signals, such as those related to the sigma delta modulated process or the D/A conversion process, thus providing an analog output signal at node 922 having low distortion. Nodes 911 and 922 may be coupled to a telephone line to allow reception and transmission of signals .over a telephone line.

Figure 5A:
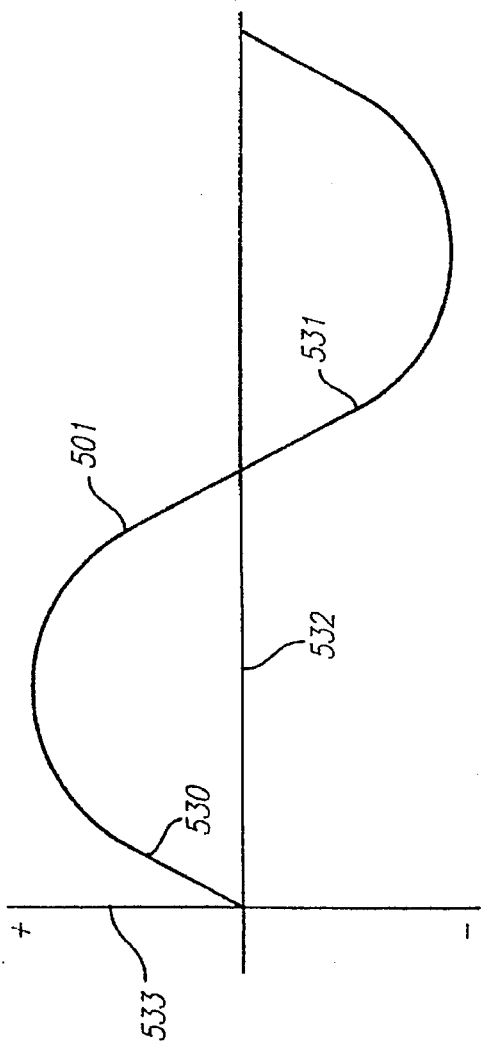
FIGS. 5A and 5B illustrate an example of sigma delta modulation.
Figure 5B:
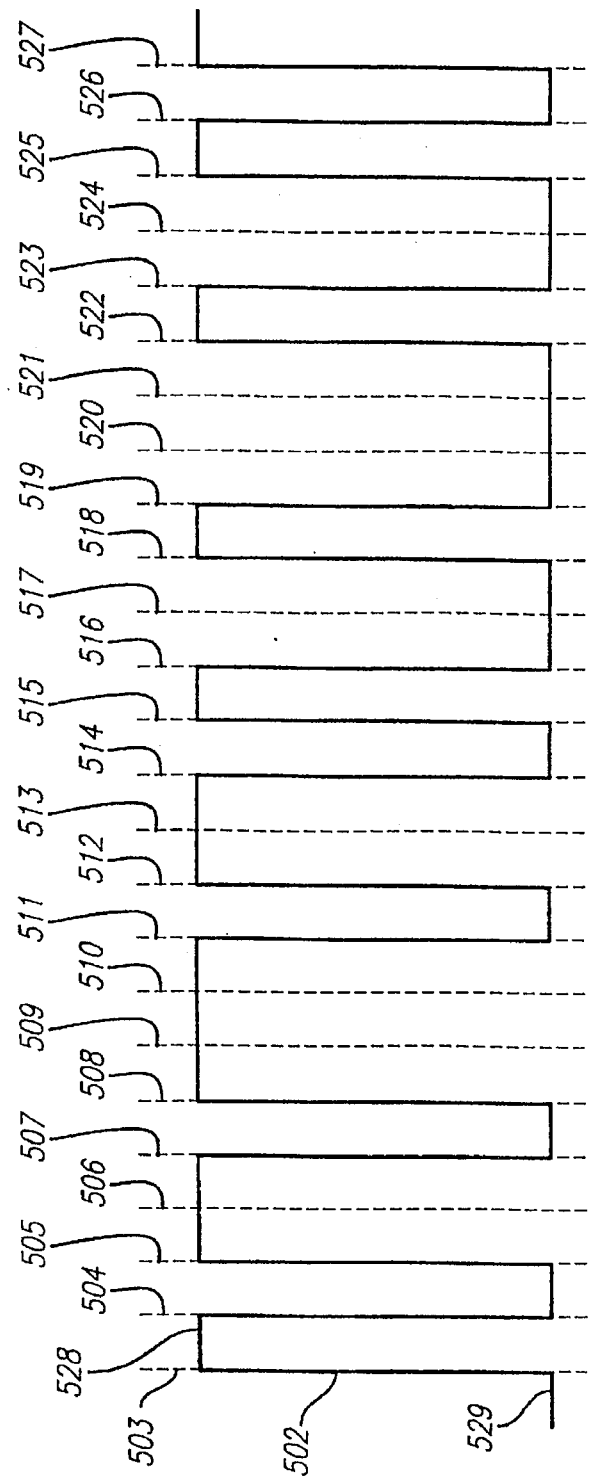

FIGS. 5A and 5B illustrate an example of sigma delta modulation. FIG. 5A illustrates an analog signal. Waveform 501 illustrates one cycle of a sine wave. FIG. 5B illustrates a sigma delta bit stream derived from the analog signal of FIG. 5A. The sigma delta bit stream is illustrated by waveform 502.

Waveform 502 is a digital signal that may have an instantaneous level of high level 528 or low level 529. Waveform 502 may transition between levels at regular clock intervals as illustrated by times 503 through 527. For example, waveform 502 is at low level 529 prior to time 503. At time 503, waveform 502 transitions to high level 528. At time 504, waveform 502 transitions from high level 528 back to low level 529.

Waveform 502 is dependent upon waveform 501. The number of pulses of waveform 502 where waveform 502 is at high level 528 increases during portions of waveform 502 corresponding to portions of waveform 501 have an increased amplitude in the positive direction of axis 533. The number of pulses of waveform 502 having a low level 529 increases over portions of waveform 502 corresponding to portions of waveform 501 that have a more negative value along axis 533. The likelihood that waveform 502 will be at high level 528 is dependent upon the location of the corresponding point of waveform 510 along axis 533, with the likelihood increasing in the positive direction of axis 533 and decreasing in the negative direction of axis 533.

FIGS. 8A and 8B illustrate an example of Manchester encoded sigma delta modulation. FIG. 8A illustrates an analog signal. Waveform 801 illustrates one cycle of a sine wave. FIG. 8B illustrates a Manchester encoded sigma delta bit stream derived from the analog signal of FIG. 8A. The Manchester encoded sigma delta bit stream is illustrated by waveform 802.

Waveform 802 is a digital signal that may have an instantaneous level of high level 828 or low level 829. Waveform 802 may transition between levels at regular clock intervals as illustrated by times 803 and 806. With Manchester encoding, in the middle of every clock period, waveform 802 transitions between levels. For example, waveform 802 is at low level 829 prior to time 803. At time 803, waveform 802 transitions to high level 828. In the middle of the clock period between time 803 and time 804, waveform 802 transitions to low level 829. Waveform 802 remains at low level 829 for the remainder of that dock period. At time 804, waveform 802 remains at low level 829 until the middle of the clock period between time 804 and time 805, when waveform 802 transitions from low level 829 to high level 828. For any clock period, waveform 802 represents a logical one when it remains at high level 828 for the former portion of the clock period and transitions to low level 829 for the latter portion of the dock period. Likewise, waveform 802 represents a logical zero when it remains at low level 829 for the former portion of the clock period and transitions to high level 828 for the latter portion of the dock period.

Waveform 802 is dependent upon waveform 801. The number of pulses of waveform 802 where waveform 802 represents a logical one increases during portions of waveform 802 corresponding to portions of waveform 801 that have an increased amplitude in the positive direction of axis 833. The number of pulses where waveform 802 represents a logical zero increases over portions of waveform 802 corresponding to portions of waveform 801 that have a more negative value along axis 833. The likelihood that waveform 802 will represent a logical one is dependent upon the location of the corresponding point of waveform 801 along axis 833, with the likelihood increasing in the positive direction of axis 833 and decreasing in the negative direction of axis 833.

Manchester encoding ensures a DC balanced signal, which allows for easier decoding of the signal on the opposite side of the isolation barrier. Although Manchester encoding is described, other encoding schemes, as are well known in the art, may be used in conjunction with the present invention. Alternatively, a decision feedback equalizer, which is well known in the art, may be used to recover an unencoded signal, such as that illustrated in FIG. 5B, eliminating the need for an encoding scheme.

Figure 6A:
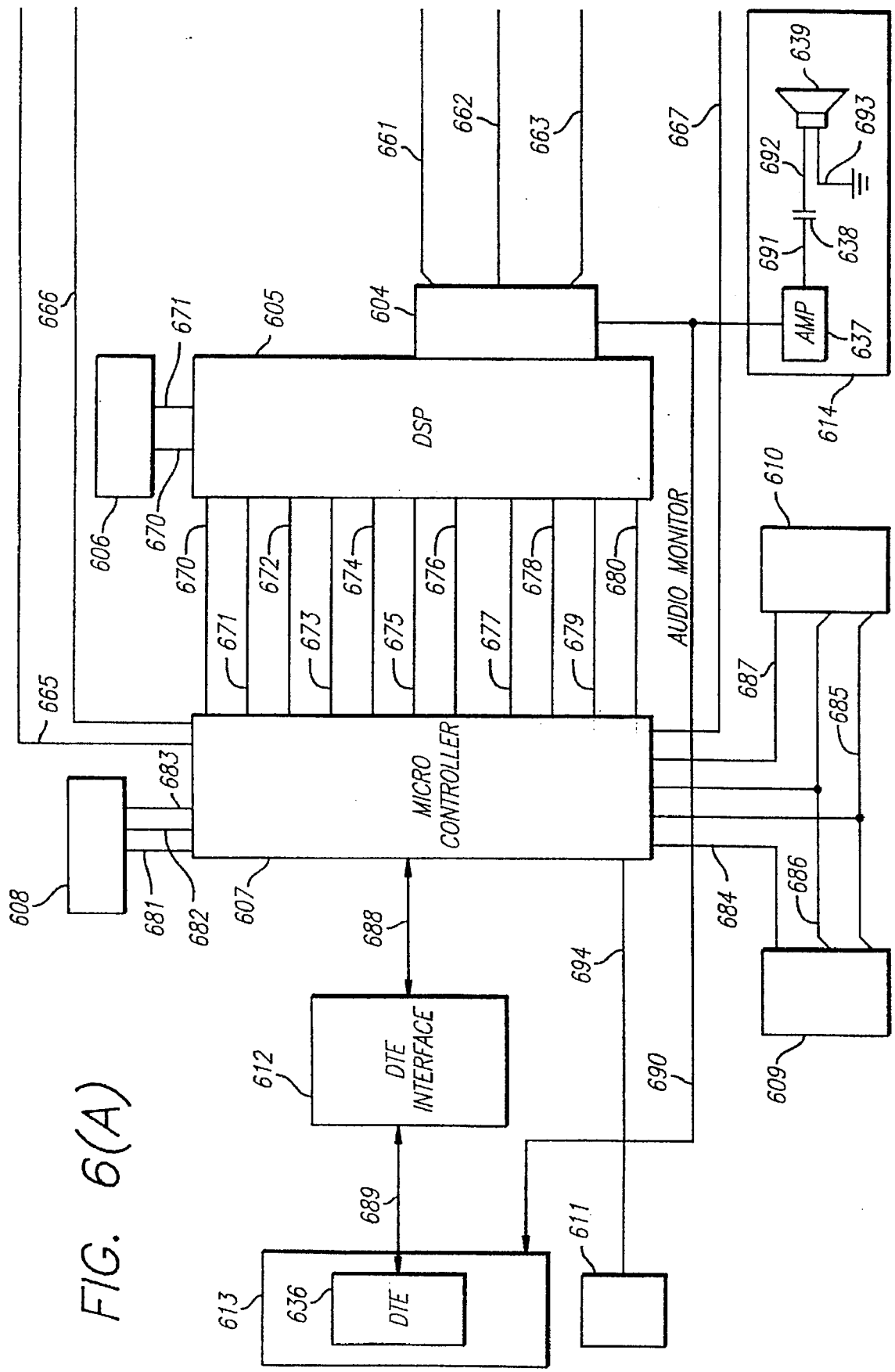
FIGS. 6(A) and 6(B) illustrate a diagram of a system that comprises an embodiment of the present invention.
Figure 6B:
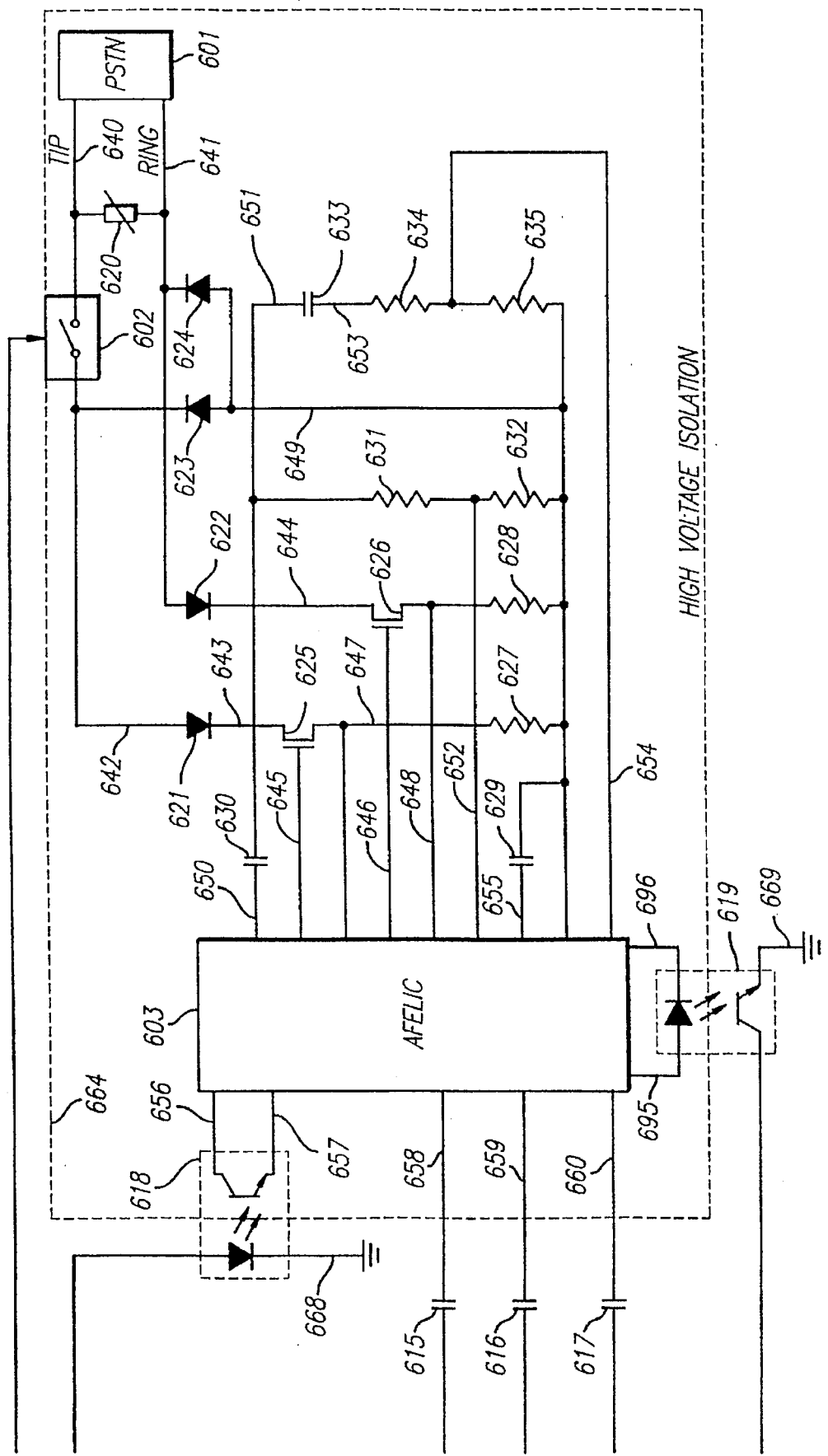
Figure 7:
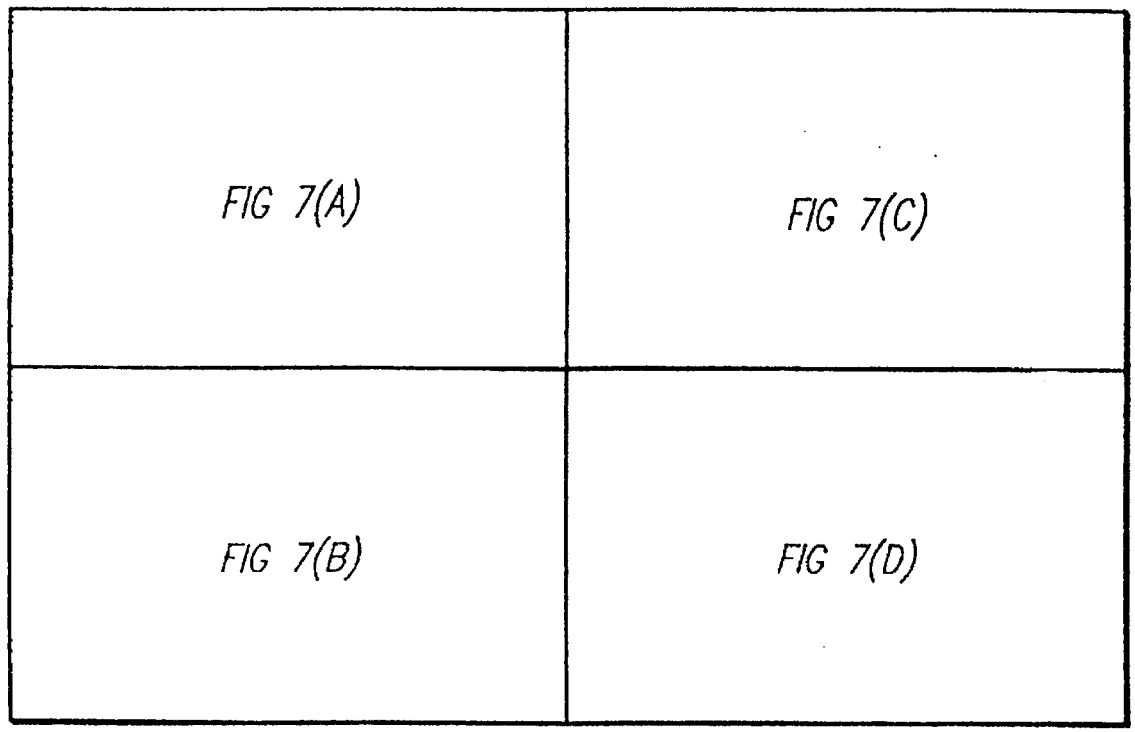
FIG. 7 is a diagram illustrating the respective orientation of FIGS. 7(A), 7(B), 7(C), and 7(D) relative to one another.
Figure 7A:
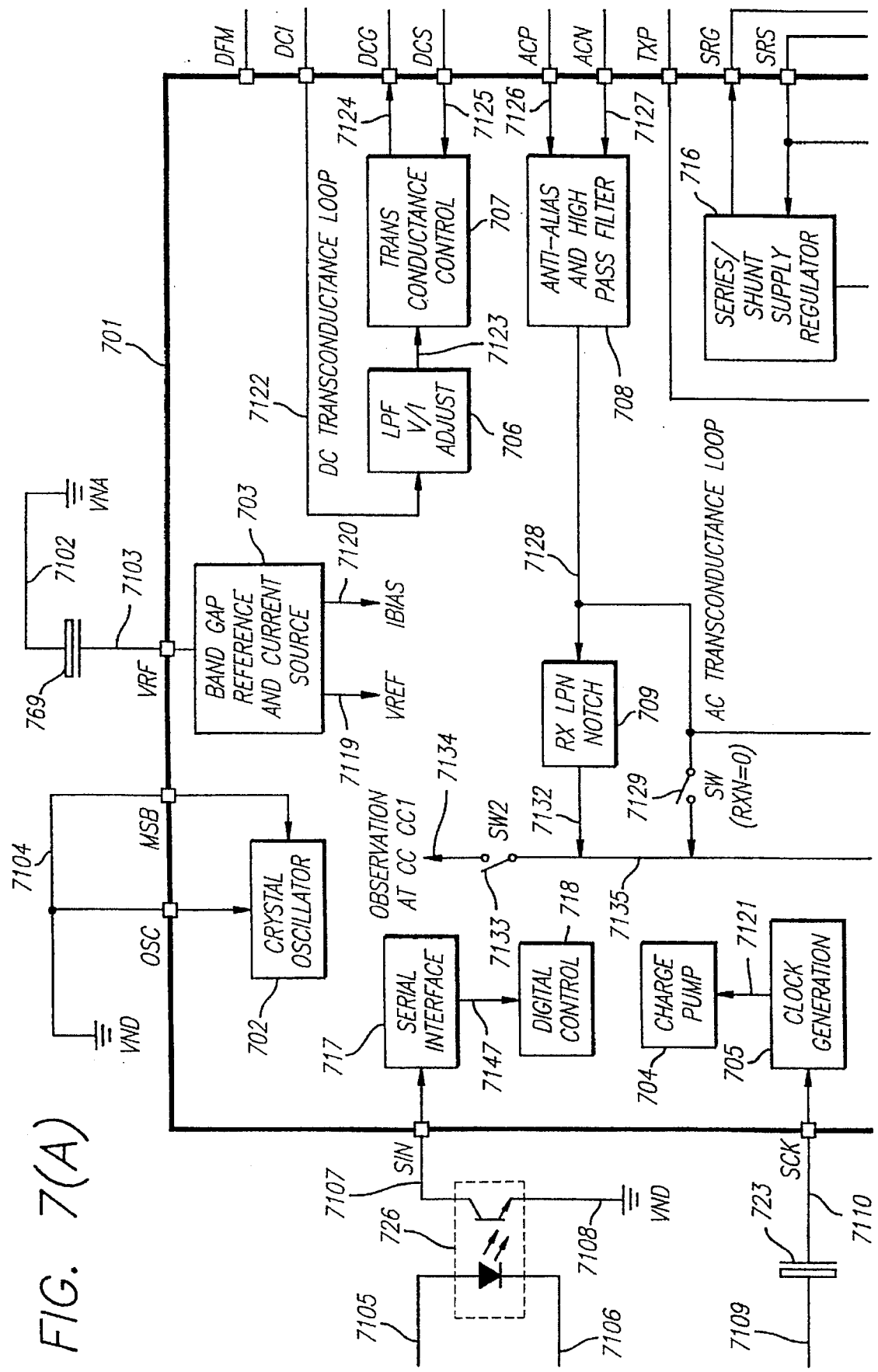
FIGS. 7(A), 7(B), 7(C), and 7(D) illustrate schematic diagram illustrating a circuit comprising an embodiment of the present invention.
Figure 7B:
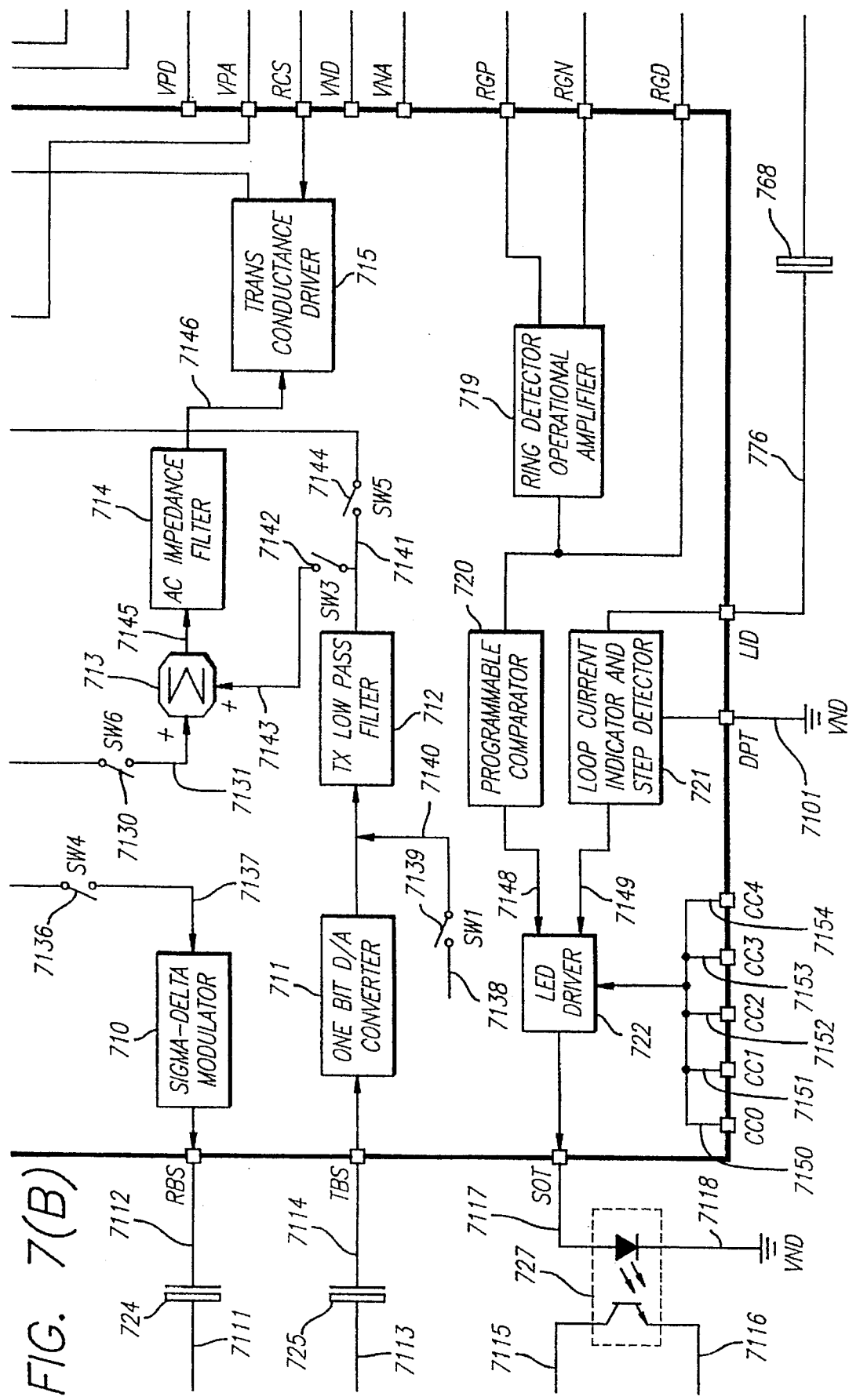
Figure 7C:
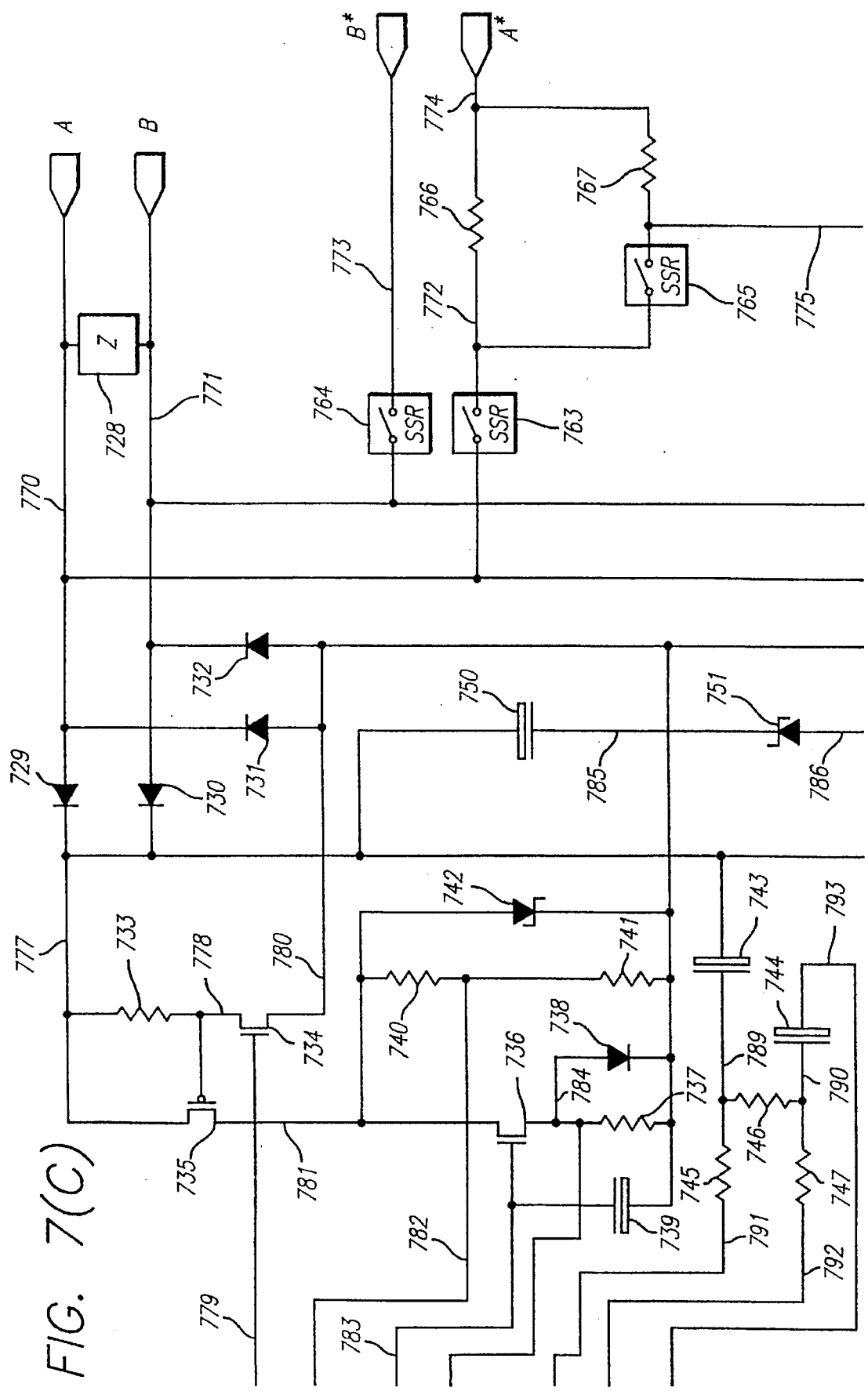
Figure 7D:
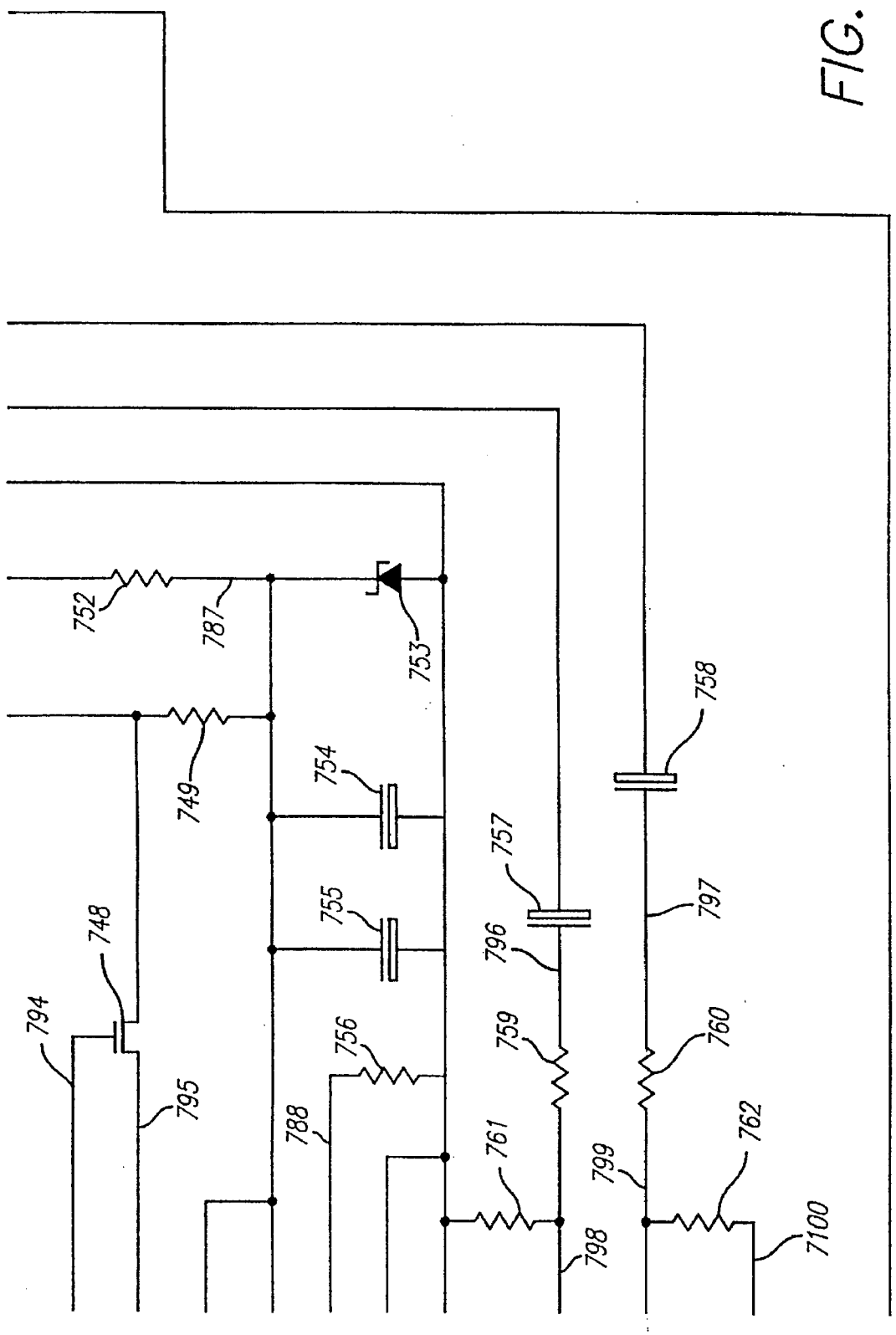

FIGS. 6(A) and 6(B) illustrate a diagram of a system that comprises an embodiment of the present invention. Tip connector 640 and ring conductor 641 are coupled to public switched network 601. Protector 620, which may be a varistor, such as a metal oxide varistor (MOV), or a sidactor, is coupled across tip conductor 640 and ring conductor 641. Tip conductor 640 is coupled to a first terminal of hook switch 602. A second terminal of hook switch 602 is coupled to node 642. Node 642 is coupled to the anode of diode 621 and to the cathode of diode 623. Ring conductor 641 is coupled to the anode of diode 622 and to the cathode of diode 624. The anode of diode 623 is coupled to the anode of diode 624 at node 649. The cathode of diode of 621 is coupled to node 643 and to the first terminal of field effect transistor (FET) 625. The gate of FET 625 is coupled to node 645 and to analog front and line interface circuit 603. The second terminal of FET 625 is coupled to node 647, to analog front end line interface circuit (AFELIC) 603, and to the first terminal of resistor 627. The cathode of diode 622 is coupled to node 644 and to the first terminal of FET 626. The gate of FET 626 is coupled to node 646 and to AFELIC 603. The second terminal of FET 626 is coupled to node 648, to AFELIC 603 and to the first terminal of resistor 628.

AFELIC 603 is coupled to node 650 and to the first terminal of capacitor 630. The second terminal of capacitor 630 is coupled to the first terminal of resistor 631 and to the first terminal of capacitor 633 at node 651. The second terminal of resistor 631 is coupled to AFELIC 603 and to the first terminal of resistor 632. The second terminal of capacitor 633 is coupled to node 653 and to the first terminal of resistor 634. The second terminal of resistor 634 is coupled to node 654 and to AFELIC 603. The second terminal of resistor 634 is also coupled to the first terminal of resistor 635. AFELIC 603 is coupled to node 655 and to the first terminal of capacitor 629. The second terminal of capacitor 629 is coupled to AFELIC 603. The second terminal of resistor 627, the second terminal of resistor 628, the second terminal of resistor 632 and the second terminal of resistor 635.

AFELIC 603 is coupled to node 695, which is coupled to the anode of the LED of optocoupler 619. The cathode of the LED of optocoupler 619 is coupled to node 696, which is coupled to AFELIC 603. AFELIC 603 is coupled to node 656, which is coupled to the collector of the photo transistor of optocoupler 618. The emitter of the photo transistor of optocoupler is coupled to node 657, which is coupled to AFELIC 603. AFELIC 603 is coupled to node 658, node 659, and node 660. Node 658 is coupled to the first terminal of capacitor 615. Node 659 is coupled to the first terminal of capacitor 616. Node 660 is coupled to the first terminal of capacitor 617. The above-described circuitry is illustrated as contained within high voltage isolation barrier 664. The high voltage isolation barrier provides the necessary isolation between the voltages that may be present on the public switched telephone network 601 and the host system 613.

The second terminal of capacitor 615 is coupled to node 661, which is coupled to analog front end interface (AFE interface) 604. The second terminal of capacitor 616 is coupled to node 662, which is coupled to AFE interface 604. The second terminal of capacitor 617 is coupled to node 663, which is coupled to AFE interface 604. AFE interface 604 provides an analog audio monitor signal at node 690. Node 690 is coupled to host block 613 and to amplifier 637 of audio output block 614. Amplifier 637 provides an output signal at node 691 which passes through capacitor 638 to appear at node 692. Node 692 is coupled to the first terminal of speaker 639. The second terminal of speaker 639 is coupled to node 693, which is coupled to ground. Audio output block 614 comprises amplifier 637, capacitor 638, and speaker 639. The audio monitor signal at node 690 is coupled to host block 613. AFE interface 604 is coupled to DSP block 605.

DSP block 605 is coupled through nodes 670 and 671 to block 606. DSP block 605 is also coupled to microcontroller 607 through nodes 670, 671, 672, 673, 674, 675, 676, 677, 678, 679, and 680. Microcontroller 607 is coupled through node 665 to the control terminal of hook switch 602. Microcontroller 607 is also coupled through node 666 to the anode of the LED of optocoupler 618. The cathode of the LED of optocoupler 618 is coupled to node 668, which is coupled to ground. Microcontroller 607 is coupled through node 667 to the collector of the phototransistor of optoisolator 619. The emitter of the phototransistor of optoisolator 619 is coupled to node 669, which is coupled to ground.

Microcontroller 607 is coupled through nodes 681, 682, and 683 to block 608. Microcontroller 607 is coupled through nodes 684, 685, 686, and 687 Microcontroller 607 is coupled through nodes 681, 682, and 683 to block to block 609 and block 610. Microcontroller 607 is coupled through bus 694 to block 611. Microcontroller 607 is coupled through bus 688 to DTE interface 612. DTE interface 612 is coupled through bus 689 to the DTE circuit 636 of host system 613.

FIGS. 7(A), 7(B), 7(C), and 7(D) illustrate schematic diagram illustrating a circuit comprising an embodiment of the present invention. Analog front end line interface circuit 701 comprises crystal oscillator 702, bandgap reference and current source 703, charge pump 704, dock generation block 705, low pass filter V/I adjustment block 706, transconductance control block 707, anti alias and high pass filter block 708, receive low pass and notch filter block 709, sigma-delta modulator 710, one bit D/A converter 711, transmit low pass filter 712, summer 713, AC impedance filter 714, transconductance driver 715, series/shunt supply regulator 716, serial interface 717, digital control block 718, ring detector operational amplifier 719, programmable comparator 720, loop current indicator and step detector 721, and photodiode driver 722.

The two conductors of a telephone line are coupled to nodes 770 and 771. Protector 728, which may be a varistor, metal oxide varistor (MOV), or a sidactor, is coupled across telephone line conductors 770 and 771. Telephone line conductor 770 is coupled to the anode of diode 729, the cathode of diode 731, the first terminal of solid state relay 763, and the first terminal of capacitor 757. Telephone line conductor 771 is coupled to the anode of diode 730, to the cathode of diode 732, to the first terminal of solid state relay 764, and to the first terminal of capacitors 758. The second terminal of solid state relay 764 is coupled to node 773. The second terminal of solid state relay 763 is coupled to node 772. Node 772 is coupled to the first terminal of solid state relay 765, and to the first terminal of resistor 766. The second terminal of solid state relay 765 is coupled to the first terminal of resistor 767 and to the first terminal of capacitor 768. The second terminal of resistor 766 is coupled to node 774 and to the second terminal of resistor 767.

The second terminal capacitor 768 is coupled through node 776 to loop current indicator and step detector 721. Loop current indicator and step detector 721 is coupled through node 7101 to voltage VND, which is a digital ground. Loop current indicator and step detector 721 is coupled through node 7149 to photodiode driver 722. The second terminal of capacitor 757 is coupled through node 796 to the first terminal of resistor 759. The second terminal of capacitor 758 is coupled through node 797 to the first terminal of capacitor 760. The second terminal resistor 759 is coupled through node 798 to the first terminal of resistor 761 and to an input of ring detection operational amplifier 719. The second terminal of resistor 760 is coupled through node 799 to the first terminal of resistor 762 and to an input of ring detection operational amplifier 719. The second terminal of resistor 761 is coupled to node 780, which is coupled to voltages VNA and VND, which are analog and digital grounds, respectively.

The second terminal of resistor 762 is coupled through node 7100 to the output of ring detection operational amplifier 719 and to an input of programmable comparator 720. The output of programmable comparator 720 is coupled through node 7148 to LED driver 722. Inputs CC0, CC1, CC2, CC3, and CC4, which appear at nodes 7150, 7151, 7152, 7153, and 7154, respectively, are coupled to LED driver 722. The output of LED driver 722 is coupled through 7117 to the anode of the LED of optocoupler 727. The cathode of the LED of optocoupler 727 is coupler through node 7118 to voltage VND, which a digital ground. Node 1115 is coupled to the collector of the phototransistor optocoupler 727. The emitter of the phototransistor of optocoupler 727 is coupled to node 7116.

Node 7105 is coupled to the anode the LED of optocoupler 726. The cathode of the LED of optocoupler 726 is coupled to node 7106. The emitter of the phototransistor of optocoupler 726 is coupled through node 7108 to voltage VND, which is a digital ground. The collector of the phototransistor of optocoupler 726 is coupled through node 7107 to an input of serial interface 717. The output serial interface 717 is coupled through node 7147 to digital control block 718.

Voltage VND, which is a digital ground, is coupled through node 7104 to crystal oscillator 702. Bandgap current source 703 is coupled through node 7103 to the first terminal of capacitor 769. The second terminal of capacitor 769 is coupled through node 7102 to voltage VNA, which is an analog ground. Bandgap current source 703 provides voltage VREF at nodes 7119 and current IBIAS at node 7120.

The cathode of diode 729 is coupled through node 777 to the first terminal of PMOS FET 735, to the first terminal of resistor 733, to the cathode of diode 730, to the first terminal of capacitor 750, to the first terminal of capacitor 743, to the first terminal of resistor 749, and to the first terminal of NMOS FET 748. The second terminal of resistor 733 is coupled through node 778 to the gate terminal PMOS FET 735, and to the first terminal of NMOS FET 734. The second terminal of PMOS FET 735 is coupled through node 781 to the first terminal of NMOS FET 736, to the first terminal of resistor 740, and to the cathode of zener diode 742.

Output DFM of analog front end interface circuit 701 is coupled through node 779 to the gate of NMOS FET 734. The second terminal of resistor 740 is coupled through node 782 to input DCI of analog front end line interface circuit 701. Input DCI is coupled though node 7122 to an input of low pas filter and voltage/current (V/I) adjustment block 706. An output of low pass filter and V/I adjustment block 706 is coupled through node 7123 to an input of transconductance control block 707. The second terminal of resistor 740 is also coupled to the first terminal of resistor 741. An output of transconductance control block 707 is coupled through nodes 7124 to output OCG. Output OCG of AFELIC 701 is coupled through node 783 to the gate of NMOS FET 736 and to the first terminal of capacitor 739. The second terminal of NMOS FET 736 is coupled through node 784 to the anode of diode 738, to the first terminal of resistor 737, and to input DCS of AFELIC 701. Input DCS is coupled through node 7125 to transconductance control block 707.

Node 7109 is coupled to the first terminal of capacitor 723. The second terminal of capacitor 723 is coupled through node 7110 to clock generation circuit 705. The output of clock generation circuit 705 is coupled through node 7121 to an input of charge pump 704.

Node 7113 is coupled to the first terminal of capacitor 725. The second terminal of capacitor 725 is coupled through node 7114 to an input of one bit digital to analog (D/A) converter 711. The output of one bit D/A converter 711 is coupled through node 7140 to an input of transmit low pass filter 712. The drive point signal at inputs CC3 and CC4 are coupled through node 7138 to the first terminal of switch 7139. The second terminal of switch 7139 is coupled through node 7140 to transmit low pass filter 712. The output of transmit low pass filter 712 is coupled through nodes 7141 to the first terminal of switch 7142 and to the first terminal of switch 7144. The second terminal switch 7142 is coupled through node 7143 to a noninverting input of summer 713. The second terminal of switch 7144 is coupled through node 793 to the first terminal of capacitor 744.

The second terminal of capacitor 743 is coupled through node 789 to the first terminal of resistor 746 and to the first terminal of resistor 745. The second terminal of capacitor 744 is coupled through node 790 to the second terminal resistor 746 and to the first terminal of resistor 747. The second terminal of resistor 745 is coupled through node 791 to input ACP of AFELIC 701. Input ACP is coupled through node 7126 to an input of anti alias and high pass filter 708. The second terminal of resistor 747 is coupled through node 792 to input ACN of AFELIC 701. Input ACN is coupled through node 7127 to an input of anti alias and high pass filter 708.

The output of anti alias and high pass filter 708 is coupled through node 7128 to an input of low pass and notch filter 709, to the first terminal of switch 7129, and to the first terminal of switch 7130. The second terminal of switch 7130 is coupled through node 7131 to a non inverting input of summer 713.

The output of receive low pass and notch filter 709 is coupled through node 7132 to the first terminal of switch 7133, and through node 7135 to the first terminal of switch 7136. The second terminal of switch 7129 is also coupled to the first terminal of switch 7133 and the first terminal of switch 7136. The second terminal of switch 7133 is coupled through node 7134 to an observation signal at input CC0 and CC1. The second terminal of switch 7136 is coupled through node 7137 to an input of sigma delta modulator 710. The output of sigma delta modulator 710 is coupled through node 7112 to the first terminal of capacitor 724. The second terminal of capacitor 724 is coupled to node 7111.

The output of summer 713 is coupled through node 7145 to the input of AC impedance filter 714. The output of AC impedance filter is coupled through node 7146 to a first input of transconductance driver 715. A second input of transconductance driver 715 is coupled through node 788 to the first terminal of resistor 756. The output of transconductance driver 715 is coupled to an input of series/shunt supply regulator 716. The second terminal of NMOS FET 748 is coupled through node 795 to an input of series/shunt supply regulator 716. An output of series/shunt supply regulator 716 is coupled through node 794 to the gate terminal of NMOS FET 748.

The second terminal of capacitor 750 is coupled through node 785 to the cathode of zener diode 751. The anode of zener diode 751 is coupled through node 786 to the first terminal of resistor 752.

Series/shunt supply regulator 716 is coupled to voltages VPA and VPD, which are analog and digital supply voltages, respectively. Voltages VPA and VPD are also coupled through node 787 to the second terminal of resistor 749, to the second terminal of resistor 752, to the first terminal of capacitor 755, to the first terminal of capacitor 754, and to the cathode of zener diode 753.

The second terminal of NMOS FET 734 is coupled through node 780 to the anode of diode 731, to the anode of diode 732, to the anode zener diode 742, to the second terminal of resistor 741, to the cathode of diode 738, to the second terminal of resistor 737, to the second terminal of capacitor 739, to the anode of zener diode 753, to the second terminal of capacitor 754, to the second terminal of capacitor 755, to the second terminal of resistor 756, and to voltages VNA and VND, which are analog and digital grounds, respectively.

The telephone line which comprises conductors 770 and 771 is fullwave rectified by diodes 729, 730, 731, and 732 to provide a negative voltage at the anodes of diodes 731 and 732 and a positive voltage at the cathodes of diodes 729 and 730. The negative voltage at the anodes of diodes 731 and 732 is coupled to voltage VND and voltage VNA. Thus, the negative voltage at the anodes of diodes 731 and 732 is used as both an analog and digital ground. The positive voltage at the cathodes of diodes 729 and 730 is regulated by series/shunt supply regulator 716 to provide voltages VPA and VPD, the positive analog and digital supply voltages respectively.

A sigma-delta modulated transmit signal at node 7113 is coupled through capacitor 725 to one bit D/A converter 711. One bit D/A converter 711 converts the sigma-delta bit stream to an analog signal. Transmit low pass filter 712 filters the analog signal to reduce quantization noise. The filtered analog transmit signal is provided to summer 713 and is also applied to a single-ended to differential conversion circuit comprising capacitors 743 and 744 and resistors 745, 746, and 747. The differential input signal from the single-ended to differential conversion network is applied to anti-alias and high-pass filter 708, which removes components of the signal that would otherwise be aliased during sigma-delta modulation. The filtered signal is passed through receive low-pass and notch filter 709 to sigma-delta modulator 710. Receive low-pass and notch filter 709 may be bypassed by switch 7129. Sigma-delta modulator 710 produces a sigma-delta bit stream of the receive signal that is coupled through capacitor 724 to node 7111.

Since the transmit signal at node 793 is a single ended signal referenced to voltage VNA, which is derived from the negative side of the telephone line, and the signal at node 777 is derived from the positive side of the telephone line, the signal applied to capacitor 743 has a voltage equal to the voltage of the positive side of the telephone line, neglecting diode drops, and the signal applied to capacitor 744 has a voltage equal to the negative side of the telephone line offset in a positive direction by the magnitude of the transmit signal, again neglecting diode voltage drops. If the transmit signal is 0, the signal applied capacitor 744 has a voltage equal to the voltage of the negative side of the telephone line. Thus, the voltage across the telephone line is applied across capacitors 743 and 744. Since any received signal is present across the telephone line, the received signal will be applied to capacitors 743 and 744. The received signal is then filtered, sigma-delta modulated, and coupled across capacitor 724 to node 7111.

If a transmit signal is applied to node 7113, it is coupled through capacitor 725 to one bit D/A converter 711. One bit D/A converter 711 converts the sigma-delta bit stream input to an analog transmit signal, which is low-pass filtered by transmit low-pass filter 712. The low-pass filtered analog transmit signal is summed with the signal at node 7131 and passed through AC impedance filter 714 to transconductance driver 715. Transconductance driver 715 causes the transmit signal to be applied to the phone line.

Since transconductance driver 715 applies the transmit signal to the telephone line, both the transmit signal and the receive signal are present simultaneously on the telephone line. To properly receive the receive signal, it is necessary to separate the receive signal from the transmit signal. The function of separating the transmit signal from the receive signal is commonly referred to as the hybrid function.

To provide the hybrid function, the transmit signal is applied to node 793. Since the transmit signal is applied to the telephone line, and the telephone line is coupled through diodes 729 and 730 to node 777, the transmit signal is applied to both capacitor 743 and 744. Since the transmit signal is in phase at these two capacitors, the transmit signal is applied as a common mode signal, which is canceled out by the single ended to differential conversion network. Thus, the transmit signal is not applied to anti-alias and high pass filter 708. However, since the receive signal is present as a differential signal across the telephone line, and is applied in its differential form across nodes 777 and 793, the receive signal is produced as a differential output by the single-ended to differential conversion network. Thus, the receive signal is applied to anti-alias and high pass filter 708. Since only the receive signal, not the transmit signal, is applied to anti alias and high-pass filter 708, the hybrid function has been provided.

AC and DC line impedance matching is provided by an AC transconductance loop and DC transconductance loop. The AC transconductance loop comprises the single ended to differential conversion network, anti-alias and high-pass filter 708, summer 713, AC impedance filter 714 and transconductance driver 715. The AC transconductance loop may be adjusted to match the off-hook telephone line AC impedance standards. A DC transconductance loop comprises low pass filter and voltage/current (V/I) adjustment block 706, and transconductance control 707, along with external components such as NMOS FET 736. The DC transconductance loop may be adjusted to allow with compliance with off-hook telephone line DC impedance standards.

Solid state relays 763, 764, and 765 and resistors 766 and 767 allow current sensing and switching of the telephone line. Current sensing may be used to implement a parallel pick-up feature. The parallel pick-up feature may be used to disable a modem circuit when a telephone extension is picked up. Such a feature is useful if it is desired to place an emergency voice telephone call while modem communication is in progress on the telephone line. Loop current indicator and step detector 721 may be used to sense a change in voltage caused by a change in current through resistors 766 and 767. The changes detected by loop current indicator and step detector 721 are passed to LED driver 722, which communicates the information to optocoupler 727. Other status signals may be applied at inputs CC0 through CC4. These inputs are passed to LED driver 722, which communicates the information over optocoupler 727.

Command information may be communicated to the AFELIC 701 through optocoupler 726. Signals transmitted through optocoupler 726. Signals transmitted through optocoupler 726 are received by serial interface 717, which provides the signals to digital control block 718. Digital control block 718 uses the signals to control the operation of AFELIC 701 and associated circuitry.

Clock signals applied to node 7109 are passed through capacitor 723 and received by dock generation block 705. Clock generation block 705 provides dock signals to charge pump 704. Clock generation block 705 also provides timing information other portions of AFELIC 701. For example, dock generation block 705 provides timing information to circuits for communicating through capacitors 724 and 725.

Figure 10:
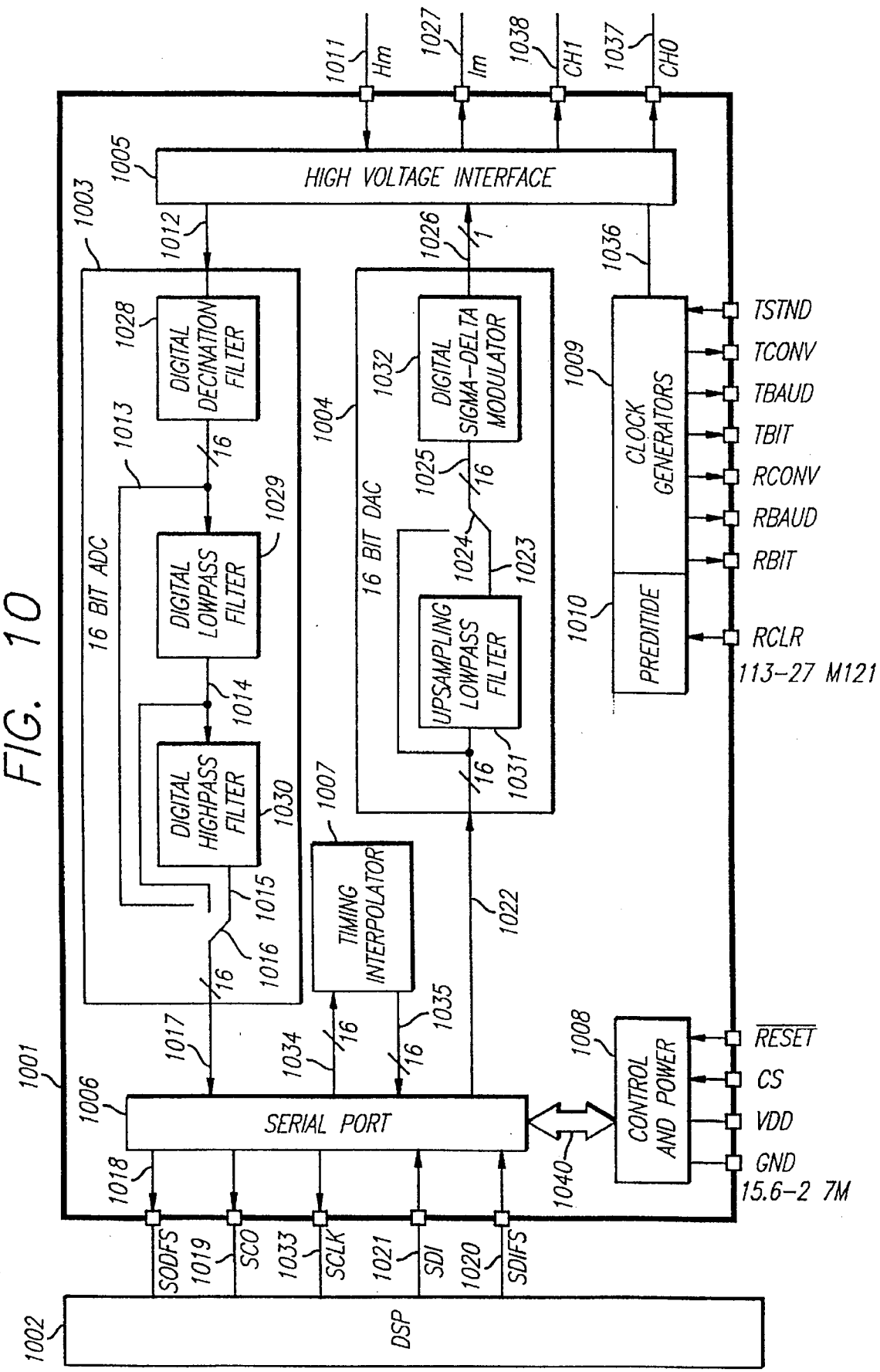
FIG. 10 is a block diagram illustrating a digital signal processing (DSP) sub-system for use with the present invention.

FIG. 10 is a block diagram illustrating a digital signal processing (DSP) sub-system for use with the present invention. The DSP sub-system comprises sigma delta conversion and digital filtering block 1001 and additional DSP circuitry block 1002. Sigma delta conversion and digital filtering block 1001 comprises analog to digital converter block 1003, digital to analog converter block 1004, high voltage interface block 1005, serial port block 1006, timing and interpolator block 1007, control and power block 1008, dock generator block 1009, and pre-divide block 1010. Input RX at node 1011 is coupled through high voltage interface block 1005 to node 1012. Node 1012 is applied to ADC block 1003, specifically to the input of digital decimation filter block 1028. The output of digital decimation filter block 1028 is coupled through node 1013 an input of digital low pass filter 1029 and to a first terminal of switch 1016. The output of digital low pass filter 1029 is coupled through node 1014 to an input of digital high filter 1030 and to a second terminal of switch 1016. The output of digital high pass filter 1030 is coupled through node 1015 to a third terminal of switch 1016. Switch 1016 has a common terminal that may be coupled selectively to one of the first terminal, second terminal or third terminal of switch 1016. The common terminal of switch 1016 is coupled to node 1017, which forms the output of ADC block 1003.

Node 1017 is coupled through serial port block 1006 to node 1018, which is coupled to additional DSP circuitry block 1002. A clock signal is also provided from serial port block 1006 through node 1019 to additional DSP circuitry block 1002.

Additional DSP circuitry block 1002 is coupled through node 1020 to serial port 1006, which is coupled to node 1022. Additional DSP circuitry block 1002 is coupled through node 1021 to serial port block 1006. Node 1022, which serves as an input to DAC block 1004, is coupled to upsampling low pass filter block 1031 and to a first terminal of switch 1024. The output of upsampling low pass filter block 1031 is coupled to node 1023, which is coupled to a second terminal of switch 1024. Switch 1024 couples a common terminal to either one of the first terminal or the second terminal of switch 1024. The common terminal of switch 1024 is coupled to node 1025, which is coupled to an input of digital sigma and delta modulator 1032. The output of digital sigma delta modulator 1032 is coupled through node 1026, which serves as the output of DAC block 1004, to high voltage interface block 1005. High voltage interface block 1005 provides output TX at node 1027.

Serial port 1006 is also coupled through node 1033 to additional DSP circuitry block 1002. Serial port 1006 is coupled through nodes 1034 and 1035 to timing interpolator block 1007. Serial port 1006 is coupled through block 1040 to control and power block 1008. Pre-divide block 1010 is coupled to dock generator block 1009. Clock generator block 1009 is coupled through block 1036 to high voltage interface block 1005. High voltage interface block 1005 provides a first clock output at node 1037 and a second dock output at node 1038. The second clock output is optional.

The circuit of FIG. 10 may be used in conjunction with circuits illustrated in other figures. For example, the circuit of FIG. 10 may be used in conjunction with block 201 of FIG. 2. Node 212 of FIG. 2 may be coupled through a capacitor such as capacitor 203 of FIG. 2 to node 1011 of FIG. 10. Node 214 of FIG. 2 may be coupled through a capacitor such as capacitor 204 of FIG. 2 to node 1038 of FIG. 10. Node 216 of FIG. 2 may be coupled through a capacitor such as capacitor 205 of FIG. 2 to node 1027 of FIG. 2. Thus, the circuit of FIG. 10, in conjunction with the circuit of FIG. 2, may be used to interface DSP circuitry to a telephone line. Elements 202, 206, and 207 of FIG. 2 would be omitted in such a combination.

The sub-system of FIG. 10 may also be used with the system illustrated in FIGS. 7(A), 7(B), 7(C), and 7(D). Node 1011 of FIG. 10 may be coupled to node 7111 of FIG. 7(B). Node 1027 of FIG. 10 may be coupled to node 1113 of FIG. 7(B). Node 1037 of FIG. 10 may be coupled to node 7109 of FIG. 7(A). Sigma Delta modulated signals from the circuit of FIG. 7(B) pass through capacitor 724 to node 7111. The signals at node 7111 are coupled through node 1011 and through high voltage interface block 1005 to node 1012. The signals at node 1012 are applied to digital decimation filter 1028. Digital decimation filter block 1028 provides a digital representation at node 1013 derived from the signal at node 1012. If a coding scheme is used in conjunction with the sigma delta modulation technique, the signal at node 1012 may be applied to a decoder prior to being applied to digital decimation filter 1028. The digital representation at node 1013 is applied to digital low pass filter 1029. The output of digital low pass filter 1029 is applied to digital high pass filter 1030. The output of digital high pass filter 1030 is applied to switch 1016. Switch 1016 may be used to bypass digital high pass filter 1030 or to bypass the combination of digital high pass filter 1030 and digital low pass filter 1029. The digital representation at switch 1016 is coupled through serial port 1006 and through node 1018 to additional DSP circuitry 1002. Clock information related to the digital representation is coupled through node 1019. The received signal applied to additional DSP circuitry block 1002 may be further processed and desired information may be extracted from the digital representation.

A digital representation of a transmit signal may be generated or received by additional circuitry block 1002. The digital representation of the transmit signal is coupled through node 1021 and through serial port 1006 to node 1022. The digital representation at node 1022 is applied to upsampling low pass filter 1031. The output of upsampling low pass filter 1031 passes through switch 1024 to digital sigma delta modulator block 1032. Upsampling low pass filter 1031 may be bypassed by switch 1024. The output of digital sigma delta modulator 1032 is applied through node 1026, through high voltage interface 1005, and through node 1027 to node 7113 of FIG. 7(B). Box signals generated by pre-divide 1010 and dock generation block 1009 are coupled through block 1036 to high voltage interface 1005. The dock signals at high voltage interface 1005 are coupled through node 1037 to node 7109 of FIG. 7(A). Optionally, dock signals at high voltage interface 1005 may be coupled through node 1037 to additional dock circuitry.

Thus, a method and apparatus for communicating a signal across a capacitive isolation barrier using sigma delta modulation has been provided.

We claim:

1. A circuit for communicating a signal across an isolation barrier, said circuit comprising:

a modulator for receiving an analog input signal and for providing a modulated signal;

a capacitor coupling said modulated signal across an isolation barrier;

a demodulator for receiving said modulated signal and for providing an output signal;

a filter circuit coupled to a telephone line and to said modulator for providing an analog input signal to said modulator, said filter circuit and said modulator powered from said telephone line;

a lowpass filter coupled to said demodulator for filtering said output signal, said modulator comprising a sigma delta modulator circuit and said filter circuit comprising an anti-alias and highpass filter;

a second filter circuit for filtering a second signal, said second filter circuit comprising a second anti-alias and highpass filter;

a second modulator coupled to said second filter circuit for receiving said second signal from said second filter circuit and for producing a second modulated signal, said second modulator comprising a second sigma delta modulator circuit;

a second capacitor coupled to said second modulator for coupling said second modulated signal across said isolation barrier;

a second demodulator coupled to said second capacitor for receiving said second modulated signal from said second capacitor and for producing a second output signal;

a second lowpass filter coupled to said second demodulator for filtering said second output signal;

said signal being communicated in a first direction across said isolation barrier and said second signal being communicated in an opposite direction across said isolation barrier;

a dock oscillator for producing a dock signal;

a third capacitor coupled to said dock oscillator for coupling said dock signal across said isolation barrier;

a dock receiver for receiving said dock signal from said third capacitor.

2. A circuit for communicating a signal across an isolation barrier, said circuit comprising:

a modulator for receiving an analog input signal and for providing a modulated signal;

a capacitor coupling said modulated signal across an isolation barrier, said isolation barrier not including a transformer element;

a demodulator for receiving said modulated signal and for providing an output signal;

a filter circuit coupled to a telephone line and to said modulator for providing an analog input signal to said modulator, said filter circuit and said modulator powered from said telephone line.

a lowpass filter coupled to said demodulator for filtering said output signal, said modulator comprising a sigma delta modulator circuit and said filter circuit comprising an anti-alias and highpass filter;

a second filter circuit for filtering a second signal, said second filter circuit comprising a second anti-alias and highpass filter;

a second modulator coupled to said second filter circuit for receiving said second signal from said second filter circuit and for producing a second modulated signal, said second modulator comprising a second sigma delta modulator circuit;

a second capacitor coupled to said second modulator for coupling said second modulated signal across said isolation barrier;

a second demodulator coupled to said second capacitor for receiving said second modulated signal from said second capacitor and for producing a second output signal;

a second lowpass filter coupled to said second demodulator for filtering said second output signal.

3. The circuit of claim 2 wherein said signal is communicated in a first direction across said isolation barrier and said second signal is communicated in an opposite direction across said isolation barrier.

4. The circuit of claim 2 wherein said analog input signal comprises an audio signal.

5. The circuit of claim 4 wherein said analog input signal is received from said telephone line.

6. The circuit of claim 5 wherein said modulator is powered from said telephone line.

7. The circuit of claim 6 wherein said output signal comprises an analog output signal, wherein said analog output signal is provided to an analog circuit.

8. The circuit of claim 7 wherein said demodulator is powered from a source that supplies said analog circuit.

9. The circuit of claim 6 wherein said output signal comprises a digital output signal, wherein said digital output signal is provided to a digital signal processing (DSP) circuit.

10. The circuit of claim 9 wherein said demodulator is powered from a source that supplies said DSP circuit.

11. A circuit for communicating a signal across an isolation barrier, said circuit comprising:

a modulator for receiving an analog input signal and for providing a modulated signal;

a capacitor coupling said modulated signal across an isolation barrier;

a demodulator for receiving said modulated signal and for providing an output signal;

a filter circuit coupled to a telephone line and to said modulator for providing an analog input signal to said modulator, said filter circuit and said modulator powered from said telephone line;

a lowpass filter coupled to said demodulator for filtering said output signal, said modulator comprising a sigma delta modulator circuit and said filter circuit comprising an anti-alias and highpass filter;

a second filter circuit for filtering a second signal, said second filter circuit comprising a second anti-alias and highpass filter;

a second modulator coupled to said second filter circuit for receiving said second signal from said second filter circuit and for producing a second modulated signal said second modulator comprising a second sigma delta modulator circuit;

a second capacitor coupled to said second modulator for coupling said second modulated signal across said isolation barrier;

a second demodulator coupled to said second capacitor for receiving said second modulated signal from said second capacitor and for producing a second output signal;

a second lowpass filter coupled to said second demodulator for filtering said second output signal.

12. A circuit for communicating a signal across an isolation barrier, said circuit comprising:

a sigma delta modulator for receiving an analog input signal and for providing a modulated signal;

a capacitor coupling said modulated signal across an isolation barrier;

a sigma delta demodulator coupled to said isolation barrier for receiving said modulated signal and for providing a digital output signal; and a filter circuit coupled to a telephone line and to said modulator for providing an analog input signal to said modulator, said filter circuit and said modulator powered from said telephone line.

13. The circuit of claim 12 wherein said digital output signal is provided to a digital signal processing (DSP) circuit.

14. The circuit of claim 13 further comprising:

a lowpass filter coupled to said demodulator for filtering said output signal, said filter circuit comprising an anti-alias and highpass filter;

a second filter circuit for filtering a second signal, said second filter circuit comprising a second anti-alias and highpass filter;

a second modulator coupled to said second filter circuit for receiving said second signal from said second filter circuit and for producing a second modulated signal;

a second capacitor coupled to said second modulator for coupling said second modulated signal across said isolation barrier;

a second demodulator coupled to said second capacitor for receiving said second modulated signal from said second capacitor and for producing a second output signal; and a second lowpass filter coupled to said second demodulator for filtering said second output signal.

* * * * *